United States Patent [19]

Normoyle et al.

[11] Patent Number: 5,689,713

[45] Date of Patent: Nov. 18, 1997

[54] METHOD AND APPARATUS FOR INTERRUPT COMMUNICATION IN A PACKET-SWITCHED COMPUTER SYSTEM

[75] Inventors: Kevin B. Normoyle, San Jose; Zahir Ebrahim, Mountain View; Satyanarayana Nishtala, Cupertino; William C. Van Loo, Palo Alto; Sun-Den Chen, San Jose; Charles E. Narad, Santa Clara, all of Calif.

[73] Assignee: Sun Microsystems, Inc., Mountain View, Calif.

[21] Appl. No.: 425,537

[22] Filed: Apr. 20, 1995

Related U.S. Application Data

[63] Continuation-in-part of Ser. No. 414,875, Mar. 31, 1995.

[51] Int. Cl.$^6$ .............................. G06F 13/14; G06F 13/24
[52] U.S. Cl. ............................................. 395/736; 395/733
[58] Field of Search ..................................... 395/736, 733, 395/739, 741, 742, 868, 200.01

[56] References Cited

U.S. PATENT DOCUMENTS

| | | | |
|---|---|---|---|
| 4,177,515 | 12/1979 | Jenkins et al. | 395/867 |
| 4,215,399 | 7/1980 | Pavicic et al. | 364/136 |
| 4,228,503 | 10/1980 | Waite | 364/200 |

(List continued on next page.)

FOREIGN PATENT DOCUMENTS

| | | | |
|---|---|---|---|
| 0 317 481 A3 | 11/1987 | European Pat. Off. | G06F 15/16 |
| 0 380 842 A2 | 2/1989 | European Pat. Off. | G06F 12/08 |
| 0 468 831 A2 | 6/1990 | European Pat. Off. | G06F 12/08 |

(List continued on next page.)

OTHER PUBLICATIONS

D. Alpert, et al., "Architecture of the NS32532 Microprocessor", Proceeding/IEEE International Conference on Computer Design: VLSI in Computers & Processors, IEEE Computer Society Press, Oct. 5, 1987, pp. 168–172.

Jung–Herng Chang, et al., "A Second–Level Cache Controller for a Super–Scalar Sparc Processor", Spring Sompcon 92, IEEE Computer Society Press, Feb. 24, 1992, pp. 142–151.

K. Lantz, et al., "Rochester's Intelligent Gateway", Computer, vol. 15, No. 10 (Oct. 1982), pp. 54–68.

M. Cvijovic, et al., "An Approach to the Design of Distributed Real–Time Operating Systems", Microprocessors and Microsystems, vol. 16, No. 2, 1992, pp. 81–89.

*Primary Examiner*—Gopal C. Ray
*Attorney, Agent, or Firm*—Matthew Rainey

[57] ABSTRACT

An apparatus and method for handling interrupt requests from any of a plurality of interrupters to any of a plurality of interrupt handlers. Each interrupt handler includes an interrupt input request queue for holding a plurality of incoming interrupt requests. A system controller is connected to the interrupters and the interrupt handlers, and includes an input queue coupled to each interrupter for receiving a plurality of interrupt requests. The system controller includes a processor and a memory storing instructions for controlling its operation. The system controller also includes an output queue coupled to each interrupt handler (which in many cases will also be interrupters), and a counter for monitoring the current number, at any given time, of interrupt requests pending in each of the interrupt input queues in the interrupt handlers. When an interrupt request is sent from an interrupter, the system controller determines a target for the request, which may be by a target ID in the request or may be based upon a predetermined method to ensure even distribution of interrupt requests among all or a subset of the interrupt handlers. The system controller determines whether the target interrupt handler's input queue is full, and if not then it passes on the interrupt request and sends a positive acknowledgment to the interrupter. If the queue is full, then a negative acknowledgment is sent, and the interrupter then waits a random period of time and sends the interrupt request again. The target interrupt handler may thus accept multiple interrupt requests and process them in order without negative acknowledgments.

20 Claims, 11 Drawing Sheets

U.S. PATENT DOCUMENTS

| | | | |
|---|---|---|---|
| 4,604,500 | 8/1986 | Brown et al. | 379/269 |
| 4,734,882 | 3/1988 | Romagosa | 395/737 |
| 4,953,072 | 8/1990 | Williams | 395/741 |
| 4,987,535 | 1/1991 | Takayama | 395/742 |
| 5,036,459 | 7/1991 | den Haan | 364/200 |
| 5,319,753 | 6/1994 | MacKenna et al. | 395/868 |
| 5,325,536 | 6/1994 | Chang et al. | 395/736 |
| 5,428,799 | 6/1995 | Woods | 395/725 |
| 5,481,726 | 1/1996 | Kumaki et al. | 395/200.01 |
| 5,542,076 | 7/1996 | Benson et al. | 395/733 |
| 5,557,744 | 9/1996 | Kobayakawa et al. | 395/200.01 |

FOREIGN PATENT DOCUMENTS

| | | | |
|---|---|---|---|
| 0 507 571 A3 | 4/1991 | European Pat. Off. | G06F 5/06 |
| 0 537 899 A1 | 9/1991 | European Pat. Off. | G06F 9/46 |
| 0 598 535 A1 | 11/1992 | European Pat. Off. | G06F 12/08 |
| 0 644 489 A3 | 9/1993 | European Pat. Off. | G06F 9/46 |
| PCT/US92/ 05458 | 6/1992 | WIPO | G06F 13/00 |

*Slave Write Flow Control*

Figure 10: Interrupt Transaction Flow

METHOD AND APPARATUS FOR INTERRUPT COMMUNICATION IN A PACKET-SWITCHED COMPUTER SYSTEM

The present application is a CIP of application Ser. No. 08/414,875 filed Mar. 31, 1995.

BACKGROUND OF THE INVENTION

This invention describes a method and apparatus for communicating asynchronous interrupt events as from interrupting sources to interrupt handler targets across a packet-switched interconnection network in a uniprocessor or multiprocessor computer system. The interrupt events are executed as low-latency, deadlock-free, non-blocking interrupt transactions from interrupting sources such as an I/O device or a processor, to interrupt handler targets such as another processor.

Typically, I/O devices have dedicated and persistent circuit-switched interrupt signals, and it can be quite complicated to communicate them in packet-switched interconnects. In a conventional memory subsystem, for example, interrupt capability is achieved by hardwiring interrupt wires between the interrupting devices and the interruptees (the devices being interrupted). Each of these wires is unique and unchangeable, once the system is built.

Typically, the sender of the interrupt in a packet-switched interconnect needs to know the sizes of receive queues in the respective interrupt handlers (and in conventional systems, such queues have a depth of only one, meaning that an interrupt handler can accept only one interrupt request at a time). This requires advance set-up of the system and inhibits flexibility in the design once the system is implemented, particularly with the use of hardwired interrupt connections.

Conventional interrupt transactions typically take considerably more clock cycles to execute than do data transactions, because the software code path of the interrupt handler must be involved in the interrupt transactions. Hence, packet-switched interrupt transactions that cannot be delivered in a lossless interconnect (e.g., because the destinations are busy handling other interrupts) can end up remaining in a queue in the interconnect for a long time and block all transactions behind them (the Head Of Line (HOL) effect). Solving this problem is a challenge to present-day systems, because there is also a potential for deadlock when interrupt completion is communicated with a transaction that is (or might be) blocked behind other transactions.

In order to solve this problem, many mechanisms can be employed, each of them being quite complex. For instance, the interconnect can allow other transactions to bypass a blocking interrupt transaction; however, this can cause the system to come to a halt (a situation known as "live lock"), since there is nothing quenching the source of the interrupts.

Alternately, the source can be told how many total interrupt transactions it is allowed to send, and it can flow control the interrupt transaction as a special case. This requires the interrupter to have knowledge of the interrupt handler's queue sizes, and further requires some form of dynamic feedback when the destination queues are full, all of which adds to complexity.

Typically, when an I/O device interrupts with its persistent single-wire interrupt, only a single bit of information is carried to the interrupt handler, namely the interrupt level. The interrupt handler then has to poll all the possible I/O devices to see which one interrupted. This increases the latency of handling an interrupt, to as high as many microseconds. It would be preferable to provide a system where the interruptee is immediately informed of which device has interrupted, to decrease the turnaround time of the interrupt operation.

Interrupt mechanisms utilizing hardwired interrupt lines suffer from inflexibility in a number of ways. They cannot be modified to redirect the interrupts to different slaves without a hardware redesign. In such systems, the relative priority between interrupts when multiple interrupters are present is for the same reason not easily altered, and as a result there is the decided disadvantage that the designer must try to imagine all possible priority conflicts in advance, and then design those decisions into the hardware. For instance, an engineer might have to decide to take all Ethernet interrupts before any disk interrupts, when in some cases this may be desirable. As more interrupt devices are available, the priority problem becomes quite difficult, tending to suppress the number of cases that can be handled with any degree of reliable predictability and inhibiting any modifications or sealability of the system.

Another problem with hardwire interrupt mechanisms is that they do not accommodate different types of subsystems. For instance, one subsystem might have the capability of generating more than one outstanding interrupt, i.e. generate a second interrupt before the first one has been acknowledged, while others can send only one. Similarly, some slave devices are able to accept only one interrupt, and others can accept many. In current systems, these different characteristics need to be known in advance and accommodated in the design. For devices that can handle only one interrupt, for example, a queue can be established; but its size must be determined in advance, and the interrupting devices would have to have knowledge of it.

A further difficulty presented by conventional interrupt mechanisms is that simultaneous interrupts between two devices, or an interrupt sent to a device that already has a pending slave request, can result in deadlocks. For instance, device A might send an interrupt to device B, and vice versa, at virtually the same time. In prior systems, device B will cease execution of its other operations and wait until its interrupt from A is cleared, and vice versa; but if neither A nor B can clear the interrupt coming from the other, a live-lock (or deadlock) occurs. A system is needed for resolving this type of deadlock, particularly in light of the increasing of numbers of potential interrupt devices in today's systems.

Systems using hardwired interrupt mechanisms further suffer from performance due to the requirement that an interrupt destined for a particular device must go to that device and to no other, regardless of how busy that device may be. This is a bottleneck that can seriously inhibit performance of the entire system, particularly where the interrupter and interruptee being bogged down are important devices, such as a processor and a disk drive upon which other operations must wait. A mechanism for rerouting interrupts to other devices would be extremely useful in such situations.

A new system is therefore needed that provides flexible interrupt capability with the ability to assign relative interrupt priorities in software, and that accommodates different types and characteristics of interrupting devices and interruptees. Also needed are mechanisms for avoiding and/or resolving deadlocking, and for decreasing latency of interrupts.

SUMMARY OF THE INVENTION

A new architectural solution is presented, for mapping circuit-switched interrupt signals from I/O devices to packet-switched interrupt transactions. In a conventional circuit-switched system, and interrupt vector is sent with information (e.g. the address) of where to access the desired service routine, or else the interrupter must be polled for that information; by contrast, in the present system, an interrupt request packet is sent essentially simultaneously with but separably from the interrupt requests packet, and the interrupt handler can receive the necessary information and data to immediately begin processing the interrupt request.

To accomplish this, the architecture of the present invention uses a centralized system controller or interconnect (SC) that acts as an intermediary between interrupting devices and interruptees, and keeps track of the numbers of interrupts that each interruptee can handle, being sure never to send more than the allowed maximum.

The system controller also detects potential deadlock situations, and can send negative acknowledgments to the interrupters, which then wait a random amount of time before regenerating their interrupts. The randomness of the wait period makes it highly unlikely that the two interrupting devices will collide again when they regenerate their interrupts. The SC can queue up incoming interrupts, so that multiple interrupt transactions can be sent to one or more destination interrupt handlers, without the interrupters knowing in advance the sizes of the receive queues in any interrupt handler.

The SC can dynamically retarget an interrupt based on available space in the interrupt handlers, by keeping track of the multiple receive queues of the interrupt handlers of the potential interruptees. Accordingly, the interrupt source does not need to know in advance which interrupt handler should receive a given interrupt packet. The retargeting capability also reduces interrupt completion latency.

Applicant has designed a new transaction flow control system, described herein and the subject of applicant's copending U.S. patent application, "Method and Apparatus for Flow Control in a Packet-Switched Computer System" by Ebrahim et al., Ser. No. 08/414,875, which is designed to be used in conjunction with applicant's new UPA Architecture as described in detail in another of applicant's U.S. copending applications, entitled "Packet-Switched Cache Coherent Multiprocessor System" (also by Ebrahim et al., Ser. No. 08/415,175. A queuing system for outgoing master transaction requests utilizing a class concept is described in another of applicant's copending U.S. applications, entitled "A Parallelized Master Request Class Structure for Interfacing a Processor in a Packet Switched Cache Coherent Multiprocessor System" (also by Ebrahim et al., Ser. No. 08/414,922). All of these applications were filed with the United States Patent Office on filed Mar. 31, 1995, and are incorporated herein by reference. The present application is a continuation-in-part of application Ser. No. 08/414,875.

In the flow control system of the parent ('474) application, HOL-type blocking by an interrupt transaction could conceivably increase the latency of all subsequent data transactions in the outgoing master queue, which could diminish the performance of a computer system. Accordingly, the interrupt control method of the present invention makes a special exception for interrupt transactions to cleanly avoid the HOL blocking problem, as well as all deadlock and live lock conditions. To accomplish this, the interrupter is NACK'ed if the SC cannot deliver the interrupt transaction. Upon receiving a NACK, the interrupter removes the interrupt transaction from its outgoing queue, and issues it again after waiting a random (or pseudorandom, i.e. within certain bounds) interval of time. No state is left in the SC for the NACK'ed transaction, and the interrupter is solely responsible for retrying it.

By the use of the SC, a given interrupt transaction cannot block any other transactions. In addition, a dedicated input queue at the slave interface of the interrupt handler is provided, specifically for receiving interrupt transactions, which ensures that the interrupt transaction—once it has been delivered to the interrupt handler—does not block other data or control transactions received at that slave interface while the interrupt transaction awaits its turn in the interrupt input queue, thus removing all potential deadlock conditions. This also enables interrupt transactions to be flow controlled separately and independently from data transactions, which maximizes system performance.

There are no memory model semantics associated with interrupt transactions, nor are the messages in the interrupt data packet constrained by any memory model. Hence the delayed retry of the interrupt transaction by the interrupter, especially when it is a processor generating the interrupt to another processor, does not violate any processor memory models.

To decrease the latency of handling an interrupt, the system in its preferred embodiment provides a large data packet (64 bytes) along with the interrupt request transaction. This data packet can carry both interrupt priority information and device-specific identification information to the interrupt handler. The data packet can also be used to opaquely transfer state information back to the interrupt handler from the I/O device to accelerate the time it takes to handle the interrupt ("opaquely" in the sense that the SC does not need to read or understand the contents of the state information). This state information can be as simple as index information into an array in the interrupt handler, or as complex as an actual function call pointer for the specific interrupt handler for the interrupting device that the interrupt handler can jump to.

The system controller of the invention can be used in connection with single-wire interrupters, which conventionally have relative priorities assigned one a wire-by-wire basis. The current system can assign be configured in hardware or software to assign relative interrupt priorities to such incoming interrupt requests, and thus allows the interrupt requests to be sent immediately by any interrupter, leaving the priority decisions to the system controller.

The interrupt mechanism of the invention is scalable, thereby tending to minimize latency of the last interrupting device when several devices are interrupting, by way of contrast with large or maximally dimensioned interrupt systems.

The present invention employs a method and apparatus for determining the total queue sizes of all the queues in the system, and in particular the interrupt queues in interruptible devices, at initialization time, and for permitting a master (e.g. a processor) to send a number of interrupt requests only to the extent of that total. The SC is connected between one or more masters (e.g. microprocessors) and the slave devices, which may be I/O units, disk drives, memory, etc. The SC includes a request queue for each master, and each master includes a counter indicating the number of outstanding interrupts from that master to the controller.

The controller avoids issuing any interrupts downstream when the respective counter indicates that the corresponding interrupt queue downstream is full. When an interrupt is cleared, the relevant counter is decremented to indicate the availability of a place in the interrupt input queue.

The present system allows a simple, flexible design to be used, which is easily scalable and variable with the numbers and characteristics of interrupters and interruptees, and avoids the problems presented by hardwired interrupt mechanisms. The slave interrupt queues can be minimized in size as desired for price/performance considerations and desired bandwidth, without fear of losing any transactions due to smaller queue sizes.

Additionally, a variety of systems ranging from small/inexpensive to large/expensive systems can be designed from the same modular CPU and I/O interfaces by simply down- or up-scaling (-sizing) the respective queues and buffers in the SC, as desired. Since the SC controller is custom-designed to accommodate a given set of masters and slaves with a given range of queue sizes, the masters and slaves needn't be redesigned at all. Because the SC is relatively inexpensive, a number of different SC designs can be utilized without appreciably raising the cost of the system—which would not be the case if the processors and slave devices needed modification.

Sealability is facilitated by not requiring the interrupter to have any knowledge of the queue depths of the various interrupt handlers, nor how many interrupt handlers there are in the system. Instead, the packet-switched interconnection network keeps track of the queues in all the interrupt handlers as described below, and can either dynamically re-target the interrupt to an interrupt handler whose slave input queues are not full, or NACK the interrupter if the specified target is busy. This presents decided advantages over dedicated single-wire interrupt architectures, where the interrupt line may be shared by multiple interrupting devices, and where, if it is hardwired to a specific processor, no flexibility is provided for load balancing and retargeting, which are essential aspects of scalability.

However, such architectures using dedicated hardwired interrupt lines can be coupled to the apparatus of the present system, providing greater flexibility by allowing the use of older, extant apparatus ina system providing the interrupt control of the present invention.

DESCRIPTION OF THE PREFERRED EMBODIMENTS

The method and apparatus of the invention are directed specifically to interrupt handling in a uniprocessor or multiprocessor system. The interrupt transaction control of the invention works in a manner consistent with the apparatus and method of transaction flow control as described in the parent ('474) application mentioned above, but includes special features directed particularly to interrupt events, and the specific rules and method for interrupt transaction flow control for the master interface are different from the rules for data transaction flow control. Thus, below the generalized method and apparatus of transaction flow control are first described in Section 1 (in connection with FIGS. 1–7), followed by a discussion in Section 2 of the special features of interrupt transaction control (in connection with FIGS. 8 et seq.).

Section 1. General Transaction Flow Control Method and Apparatus

Figure 1:
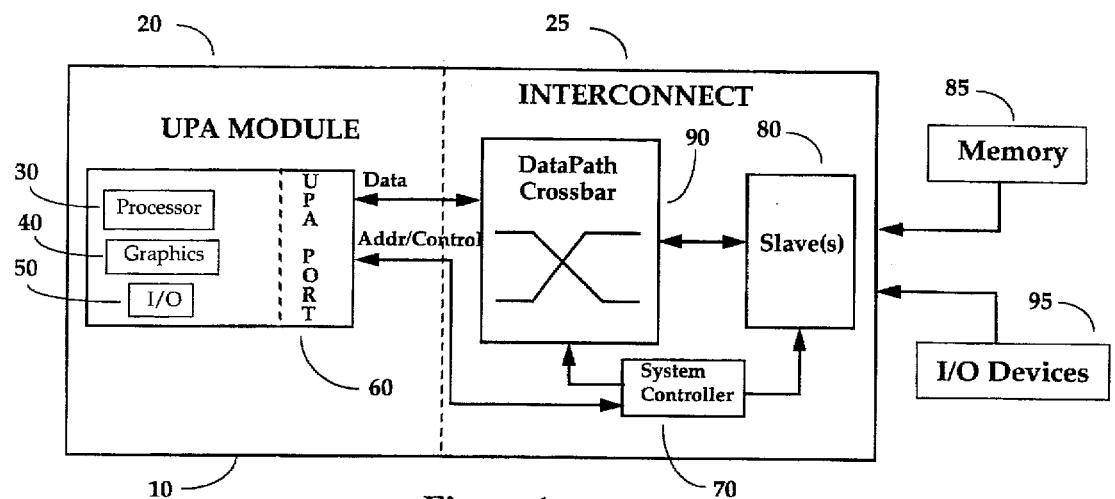
FIG. 1 is a block diagram of a preferred embodiment of a computer system incorporating the present invention.

FIG. 1 is a top-level block diagram of a computer system 10 in which the present invention is realized. This diagram relates to a specific implementation of applicant's new Ultrasparc Architecture, which is described fully in the document *UPA Interconnect Architecture*, by Bill van Loo, Satya Nishtala and Zahir Ebrahim. Sun Microsystems, Inc.'s internal release version 1.1 of the UPA Interconnect Architecture has been submitted as Appendix A to a related patent application by applicant, entitled "Method and Apparatus for Flow Control in a Packet-Switched Computer System", by Ebrahim et al. That patent application, filed in the United States Patent Office on Mar. 31, 1995, describes many of the broader features of the UPA architecture, and is incorporated herein by reference.

The generalized transaction flow control method uses a new system interconnect architecture and concomitant new methods for utilizing the interconnect to control transaction requests and data flow between master devices and slave or memory devices.

In FIG. 1, the system 10 includes a UPA module 20 and an interconnect network or module 25, which in different embodiments of the invention may or may not be connected to the data path. The UPA module may include such devices as a processor 30, a graphics unit 40, and an I/O unit 50. Other units may be included, and act as the master units for the purposes of the present invention. A master interface is defined as the interface for any entity initiating transaction requests; examples of such masters are a CPU making memory requests, or an I/O channel and bridges making DMA requests.

In general, in this application a master is exemplified by a processor. However, a master may be any transaction-requesting device, whether or not it includes a microprocessor. Similarly, a "slave" refers herein to any device that can accept a transaction request, including both memory and non-memory devices, etc., and including devices such as processors and I/O controllers that may themselves act as masters.

For the purposes of this invention, a "transaction" may be defined as a request packet issued by a master, followed by an acknowledgment packet (not necessarily a full packet, depending upon the chosen implementation) from the recipient immediately downstream. There may or may not be a data transfer accompanying a request packet, and the data transfer may either occur on the same set of wires as the request packet, or on separate datapath wires. This is described in greater detail below in connection with FIGS. 4–7.

A UPA port 60 couples the module 20 to a system interconnect controller (SC) 70, which is in turn coupled to one or more slave interface(s) 80. The slave interface may be an interface for memory (such as main memory), an I/O interface, a graphics frame buffer, one or more bridges to other interconnection networks, or even a CPU receiving transactions to be serviced. In general, any device that accepts transaction requests for servicing may be given a slave interface 80 in accordance with the invention, such as conventional memory device(s) 85 and/or standard I/O device(s) 95.

In a preferred embodiment, the system controller 70 and UPA interface 60 are carried on the main processor chip, and the slave interface is on the motherboard, though many variations are possible. More generally, each master (whether a processor or some other device) has a UPA master interface, and each slave includes a UPA slave interface. The system controller in each case resides with the system.

A datapath crossbar 90 is also included in the interconnect module 25, and is coupled to the slave interface(s), the system controller 70, and the ports 60. The datapath crossbar may be s simple bus or may be a more complicated crossbar. (The UPA ports 60 may be configured as part of either the UPA module 20 or the interconnect module 25.) The datapath unit 90 is used to transmit read and write data in a manner to be described below.

One or more conventional memories or other data storage devices 85 and one or more input/output (I/O) devices 95 forming part of the system 10 are provided for user interface, data output, etc.; these various slave devices may include RAM, ROM, disk drives, monitors, keyboards, track balls, printers, etc. They are coupled into the interconnect module 25 via the slave interfaces 80. The "slave" designation means in this case only that such devices accept requests from one or more processors and fulfill those requests.

The interconnection network may in general take the form of a number of different standard communication topologies that interconnect masters and slaves, such as a point-to-point link, a single bus or multiple buses, or switching fabrics. The interconnect may employ any of a number of conventional mechanisms for switching the transaction request to a slave using one or more signal paths, and the switching may be based either on the addressing information contained in the transaction request packet, or on another protocol not necessarily dependent on the contents of the request packet. There may be any amount of buffering, or no buffering, in the interconnect.

The preferred embodiment(s) of the invention shown in FIG. 1 (and FIG. 1A; see discussion below) has a centralized controller that connects to all masters and all slaves, and consequently has complete visibility to system request and data traffic. An alternative embodiment involves the use of distributed controllers, in which case it is desirable to maintain visibility, and in certain designs a maxima-capacity queue size may be needed.

Figure 1A:
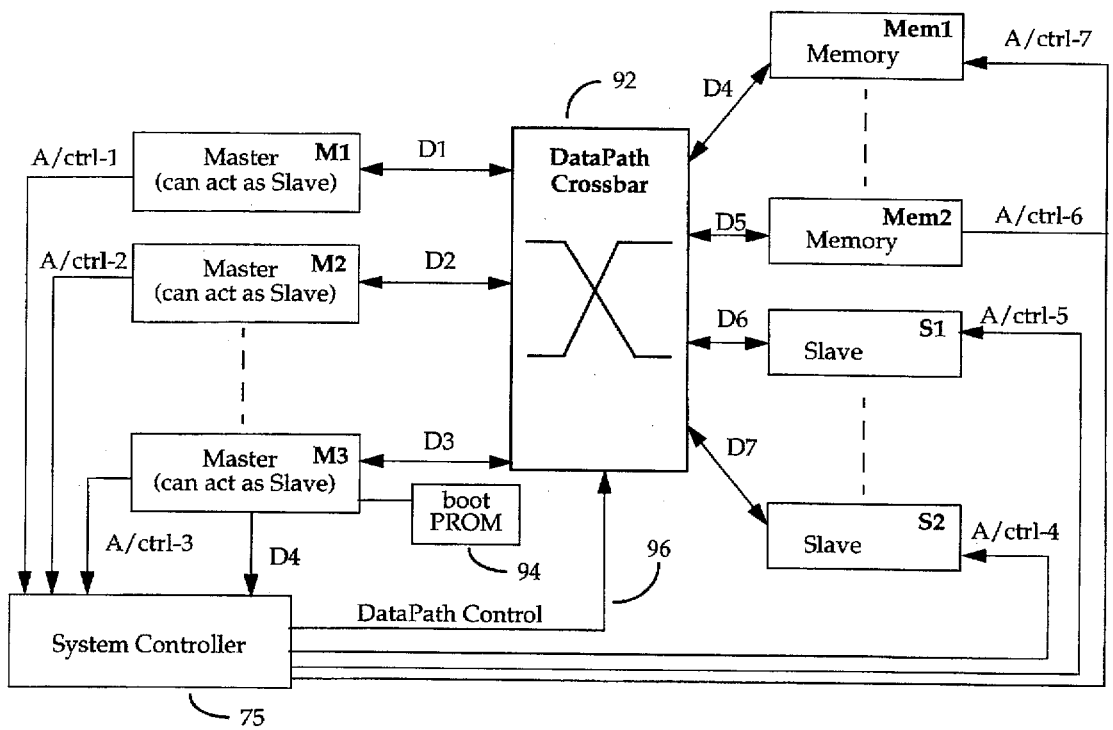
FIG. 1A is a block diagram of a more generalized embodiment of a computer system incorporating the invention.

FIG. 1A shows a more generalized block diagram of a system according to the present design. Here, there are multiple masters (three exemplary masters M1–M3 being shown). These masters may act in certain circumstances as slaves. For instance, if M1 is a processor and M3 is an I/O controller, then M3 will often act as a slave to M1, as in the initialization procedure described below. On the other hand, during a DMA (direct memory access) operation, the I/O controller M3 will act as a master to a memory device, such as any of one to many of memories represented as M1 ... M2 in FIG. 1A.

Slave devices S1 ... S2 (which may be one, several or many slave devices) are also provided, and the masters, memories and slaves are coupled via a system controller 75 in the same fashion as the system controller 70 is coupled to the master and slave(s) in FIG. 1. The SC 75 is coupled via a datapath control bus 77 to a datapath crossbar (or interconnect) 92, as with the datapath crossbar 90 in FIG. 1. The control bus 77 will typically be much narrower than the system or data buses; e.g. in a preferred embodiment of applicant's system, the datapath is 72 or 144 bits wide, while the SC datapath control bus may be only 8 bits wide.

As indicated above, the SC 75 has complete visibility to all masters, slaves, and memory. The system controller need not be on the datapath, but should have control over and visibility to the datapath.

The SC, masters, memories and slaves in FIG. 1A are interconnected by address/control (A/ctrl) lines as shown, which may be unique (dedicated, point-to-point links) address/control lines or may be bussed together. Data may also be bussed or switch-connected. Address/control and data lines/buses may share the same links, such as by providing shared address/data buses.

A boot PROM 94 is connected by a bus to the I/O controller M3, which reads it upon start-up to initialize the system in a conventional manner (e.g. to initialize the CPU, registers, etc.), and in addition to initialize the queues, registers and counters of the present design. The initialization procedure is described in detail below relative to FIG. 4.

Figure 2:
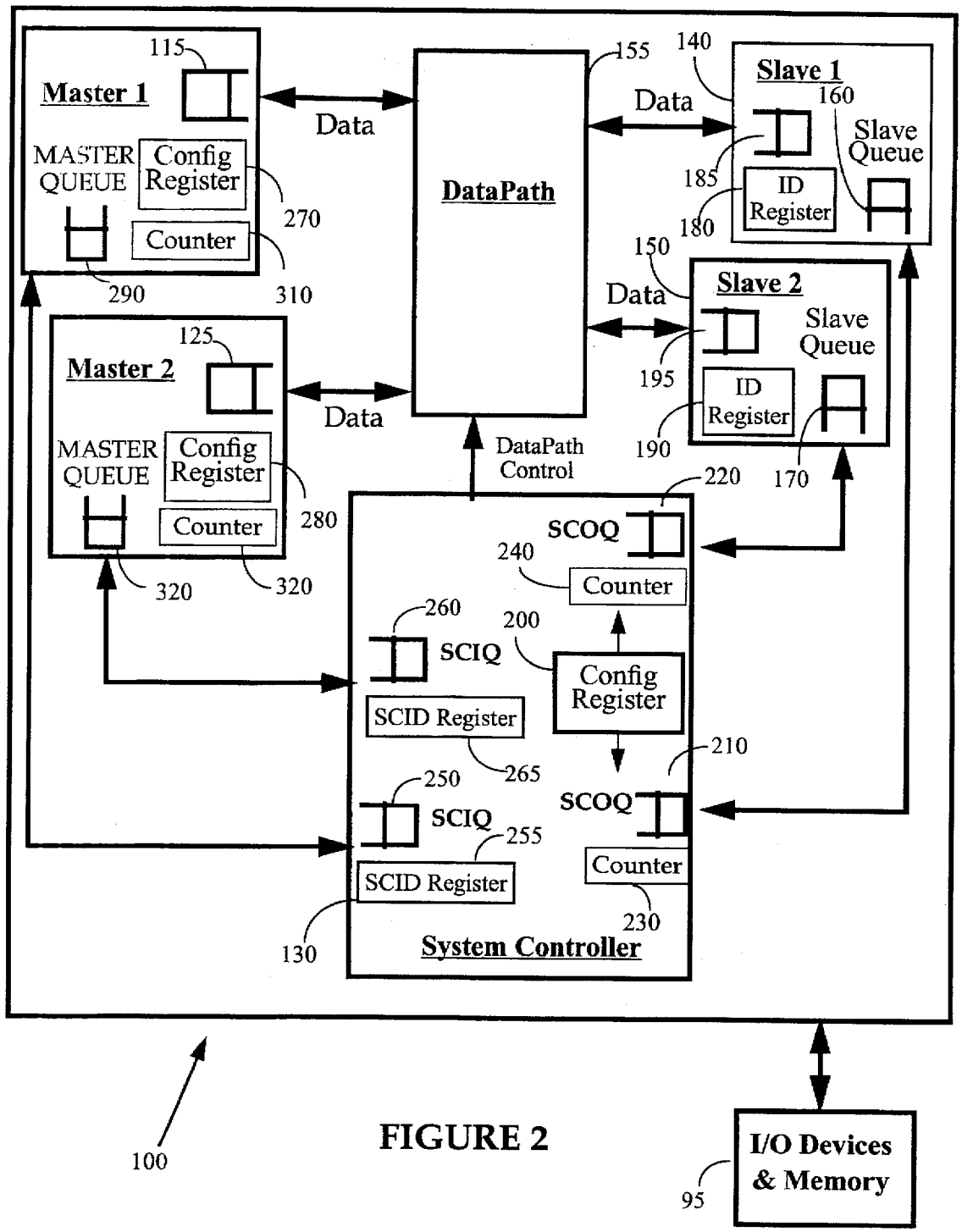
FIG. 2 is a more detailed diagram of a portion of the system shown in FIG. 1.

FIG. 2 illustrates an interconnect module 100 in a specific implementation where two master interfaces (or "masters") 110 and 120, a single system controller (SC) 130, two slaves interfaces (or "slaves") 140 and 150, and a datapath crossbar 155 are used. There may in principle any number of masters and slaves. The masters may be any of the interfaces discussed above, or in general any devices or entities capable of issuing transaction requests.

Each slave 140 and 150 includes a slave queue (160 and 170, respectively) for receiving transaction requests. The maximum sizes of these slave queues are represented by values in port ID registers 180 and 190, respectively.

Masters 110 and 120 include data queues or buffers 115 and 125, and slaves 140 and 150 include data queues or buffers 185 and 195, whose functions are described in detail relative to FIGS. 6 and 7 below. The maximum sizes of the slave write data queues 185 and 195 are also represented by values in port ID registers 180 and 190, respectively. In the special case where there is a one-to-one correspondence to a request queue entry (e.g. 100) and a data buffer in the write data queue (e.g. 185), with the write data queue being maximally dimensioned to hold an entire packet (i.e. dimensioned such that it can hold the largest contemplated packet size), then the queue size in 180 can be represented by a single number.

In FIG. 2 the slaves 140 and 150 may be any of the slave devices described above with respect to slave 80 in FIG. 1, and in particular slaves 140 and 150 may represent any number of memory or non-memory slave devices.

Initialization Operation

The basic steps that take place at initialization include:

(1) determine the sizes of the respective receive queues of all the slaves coupled to the system;

(2) store the sizes of the slave receive queues in registers within the system controller;

(3) determine the sizes of the system controller's receive queues; and (4) store the sizes of the system controller receive queues in predetermined registers in the master(s).

Thus, at system initialization, the initialization software reads the contents of the size fields for the request queue and write data queue in each slave, and then copies these values into corresponding fields inside the configuration (config) register 200 of the SC 130.

This applies to all of the input request queues (discussed below) shown in FIGS. 6 and 7, namely the PREQ, SREQ and INT request input queues. (The interrupt request queue and interrupt operation are, as noted, discussed in detail in Section 2 below.) There is a separate config register, or field within such a register, correlated with each of these queues; and there is a separate value in an ID register in each slave indicating the respective values of these queues. In addition, there is a separate counter in the SC to keep track of the number of pending requests in each of these queues. The operations of these elements is described below.

In one embodiment, the values in ID registers 170 and 180 (representing the slave queue sizes) are stored in separate fields in configuration ("config") register 200 of the SC 130. In addition, the values of the SCID registers 255 and 265 (representing the SC queue sizes) are stored in config registers 270 and 280, respectively, of the master interfaces 110 and 120.

Alternatively, config register 200 may be replaced by a separate configuration register for each UPA port implemented in the given SC. In this case, there would be two separate config registers, one for each of slaves 140 and 150.

The masters 110 and 120 also include transaction request output queues 290 and 300, respectively, which are used to queue up transaction requests from each of the master interfaces to the SC 130. Each master 110 and 120 has a counter (310 and 320) used to track the number of pending transaction requests, as described below.

The SC 130 is provided with output queues 210 and 220 and associated counters 230 and 240, respectively, whose operation will be described below.

The SC 130 also includes an SC instruction (or transaction request) queue (SCIQ) for each master, so in this case there are two SCIQ's 250 and 260. Associated with each SCIQ is an SCID register, namely registers 255 and 265, respectively, containing a value representing the maximum size of the associated SCIQ.

The circuitry for carrying out the operations of the SC is indicated by SC logic module 245 in FIG. 2, and may include conventional hardwired and/or software logic for carrying out the necessary functions. For instance, an ASIC may be provided for carrying out the transaction request handling, queue control, numerical comparisons and counting, etc. that are used in the invention. Alternatively, a general purpose processor could be used, configured (such as by program instructions stored in an associated conventional memory, e.g. ROM or RAM) to execute the functions discussed herein.

Many combinations of standard hardware and software are possible to execute these functions in the system controller; and the same is true of the functions carried out in the slave devices (see slave logic modules 142 and 152) and the master devices (see master logic modules 112 and 122). Here, the logic modules represent all of the circuitry, programming, memory and intelligence necessary to carry out the functions of the invention as described; assembling the hardware and software to do so is a matter of routine to one skilled in the art, given the teaching of this invention. (Where a master device is a processor, the logic for implementing the present invention can of course be made up in large part of the processor itself and the instructions it executes.) The particular implementation of these logic modules, and the extent to which it is represented by software or hardware, are widely variable and thus shown only in block form in FIG. 2.

The initialization sequence will now be described with reference to FIGS. 1A and 2 (for the architecture) and FIGS. 6–7 (for the flow control of the initialization sequence). The instructions for the initialization sequence are stored in nonvolatile memory, in this embodiment in the boot PROM 94. The processor M1 has a fixed address to the boot PROM 94, and accesses it by a read request over address/control line A/ctrl-1 to the SC 75. The SC sends the request via the datapath control line or bus 96 (which may be an 8-bit bus) to the datapath crossbar 92, which in turn accesses the I/O controller M3. The I/O controller thus acts as a slave to the processor M1 in this operation.

(It should be noted throughout the present description that for the sake of clarity split address and data buses are assumed and illustrated; however, the present invention is equally applicable to systems using shared address/data buses.)

The I/O controller M3 accesses the boot PROM 94 to read the code for the initialization sequence, and sends it via line A/ctrl-3 to the SC 75, which sends it on to the processor M1.

In FIG. 1A, the SC 75, masters M1–M3, slaves S1–S2 and memories Mem1–Mem2 include the config registers, counters, SCID registers, ID registers, master queues, SCIQ's, and slave queues as depicted in FIG. 2; however, for the sake of clarity these elements are not shown in FIG. 1A.

Once the processor M3 has retrieved the initialization sequence instructions from the boot PROM 94, they are executed. The first operation is to read the ID registers of the memories and slaves. These D registers, as described above with respect to FIG. 2, contain the values of the respective slaves' instruction queues and write data queues. The flow control sequence that is followed for this read operation follows that described below for the Slave Read Flow Control in FIG. 6, the data from the ID registers being retrieved via a data bus (or datapath) 715.

The ID register values are written to the config registers (such as config register 200) of the system controller (75 in FIG. 1A, 130 in FIG. 2). As discussed above, there is one config register per slave, or at least one field in a config register for each slave. The flow sequence followed for this write operation is as discussed below relative to FIG. 7. The I/O controller for the system is used for this purpose. Thus, assuming in FIG. 7 that for this operation the slave 710 is the I/O controller, the master (in this case, a processor) 700 causes the SC 720 to write the ID register values from each slave to its own config registers. In each case, the respective ID register value is stored in a buffer of the processor (master 700 in FIG. 7 or master M1 in FIG. 1A), and this value is passed to the system controller to the I/O controller (slave 710 in FIG. 7 or master/slave M3 in FIG. 1A), which then writes it right back to the system controller via the datapath provided for that purpose (data bus 715 in FIG. 7).

Figure 7:
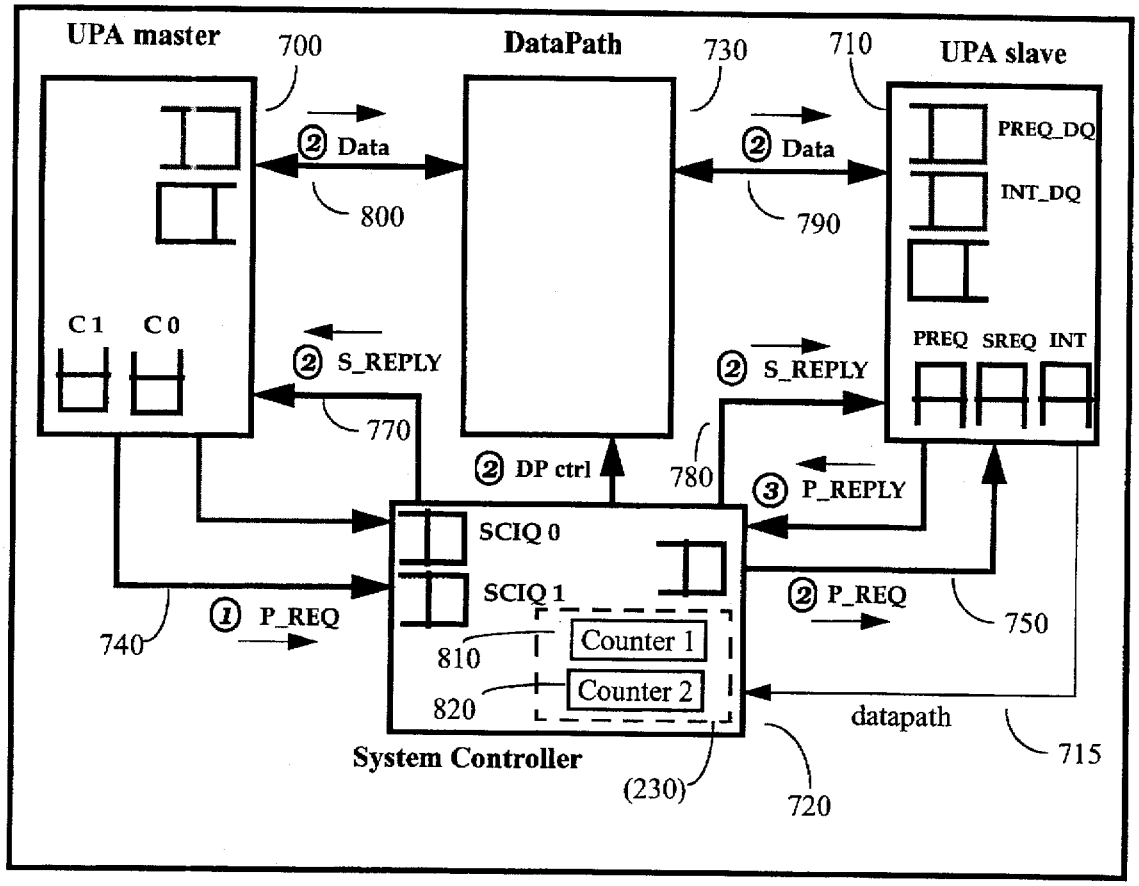

The next step in the initialization procedure is to read the sizes of the receive queues of the system controller (e.g. the SCIQ's 0 and 1 shown in FIG. 7 or SCIQ's 250 and 260 in FIG. 2). The receive queue sizes are stored in the SCID registers (see registers 255 and 265 shown in FIG. 2). This read operation is executed using the I/O controller of the system, resulting in the master/processor storing the SC receive queue values in a buffer or presssigned register.

Finally, these SCIQ sizes are written into the master config registers (such as 270 and 280 in FIG. 2). If the system is a uniprocessor system, then this amounts the processor writing the SCID values to its own config register and to the config registers of other devices that can act as masters. If it is a multiprocessor system, then one processor acts as a master and writes SCD values to both its own config register and to those of the other processors.

General Operation of Flow Control

Below is a generalized description of transaction request flow control in the present invention, followed by a more specific description of the preferred embodiment of the invention including details as to the initialization sequence and flow control for specific types of transaction requests.

After initialization of the config register 200 in the SC 130 and the config registers 270 and 280 in the masters, norms/operation of the system 100 can commence. During operation, the SC maintains in its config register 200 a copy of the respective values of the slave ID registers 180 and 190, and hence "knows" the maximum number of transaction requests that each slave interface can handle in its slave request queue (160 or 170), and the maximum amount of data that can be held in its slave data queue (185 or 195). At any given time, the counters 230 and 240 store the number of pending transaction requests in the corresponding slave request queue, and the size of the pending store data in the slave store data queue. Unissued transaction requests may in some circumstances be stored for the slaves 140 and 150 in output queues 210 and 220, which may be arbitrarily large, and in particular may be larger than the SCIQ's 250 and 260. In other circumstances, requests remain enqueued in corresponding SCIQ's.

When a master, e.g. master interface 110, has a transaction request to issue, it first compares the value in its counter 310 with the value in the config register 270. If the counter value is less than the config register value, then the request may be issued. The request is sent from the master's output queue 290 to the SCIQ 250, and the counter 310 is incremented by one.

The SC 130 then determines to which of the two slaves 140 and 150 the transaction request is destined, and checks the counter for that queue. For instance, if slave 140 is the destination for the transaction request, then the SC 130 checks the counter 210 and compares the value stored there with the value in the config register 200 corresponding to the ID register 180. If the counter 230 value is less than the value stored in the config register, then the SC 130 issues the transaction request and increments the counter 230. Otherwise, the transaction request is maintained in the output queue 210. (In some transactions related to ordering constraints for transactions for different requests from the same master, it may be desirable to leave the request in the SCIQ 250.)

Assuming the transaction request is issued in this example, then the SC 130 sends a signal to the master 110 to this effect (upon completion of the transaction, e.g. the transfer of data) and removes the transaction request from its input queue 250 (upon sending of the reply). The master 110 accordingly decrements its counter 310, which enables it to issue an additional pending transaction request. If the counter 310 was at its maximum (indicating that the SCIQ 250 was full), the decrementation of the counter 310 allows room for a single additional transaction request from the master 110 to the SC 130. If the counter 310 was not at its maximum value, then the decrementation of the counter 310 simply adds one to the number of transaction requests available to the master interface 110.

The output queues 210 and 220, which may be arbitrarily large in size (and in particular may be much larger, if desired, than SCIQ's 250 and 260 and slave input queues 160 and 170) are preferable but not necessary to the operation of the present invention. If separate output queues arc not kept for the two slaves (queue 210 for slave 140 and queue 220 for slave 150), or if ordering constraints for the master prevent the use of both queues 210 and 220, then the transaction requests stored at queues 250 and 260 must wait until the respective destination slaves can accept them before being cleared out of their queues.

Such ordering constraints in the system may be global ordering requirements. That is, in a particular system it may be required that a pending transaction in queue 210 from master 110 (intended for slave 140) be processed before a succeeding transaction from master 110 intended for slave 150 can be processed.

Aside from such an ordering requirement, or assuming the pending transactions in SCIQ's 250 and 260 are from different masters, then either of these queues 250 and 260 can release a request for either slave 140 and 150 via the SC output queues 210 and 220, thereby allowing an increase in throughput. For instance, a slave 140 request in SCIQ 260 can be sent to SC output queue 210 even if slave 140 is full (i.e. its input queue 170 is full), and a succeeding slave 150 request from SCIW 260 can then be sent to slave 150. If the SC output queues were not provided, then the slave 150 request would have to wait for slave 140 to clear before being issued. The SC output queues thus provide truly independent operation of the two slave interfaces.

The SCIQ's 250 and 260 are independent of one another, as are the master interfaces and their respective counters. Thus, the SC 130 is configured to handle a predetermined number of requests from each of the masters, with the number of requests that can be accepted from each master being independent of the other(s); that is, the sizes of the SCIQ's are independent of one another. In addition, it is possible that an individual master may be capable of multiple requests independent of others from that master, so the request queue 290 (or 300) and corresponding SCIQ 250 (or 260) can in each case be split into multiple queues.

Any master can request transactions to any slave via the SC, for any selected number of master and slaves. The SC will typically be an ASIC configured for a given system with a predetermined maximum number of master and slave interfaces. Since it is a relatively simple and inexpensive ASIC (by comparison with the system as a whole), it provides great flexibility and economy by allowing designers to easily configure different SC's at low cost for different systems, each one tailored to the specific needs of that system.

The logic for the carrying out of the invention is provided by hardware/firmware logic of the SC ASIC and the master and slave interfaces, and by program instructions stored in memory 85 of the system, as shown in FIG. 1. Alternative embodiments may implement the logic in other fashions, e.g. by providing memories and general purpose processors to carry out any of the steps executed by the master interfaces, system controller and slave interfaces of the preferred embodiment of this invention.

Operation of the System Controller

Figure 3A:
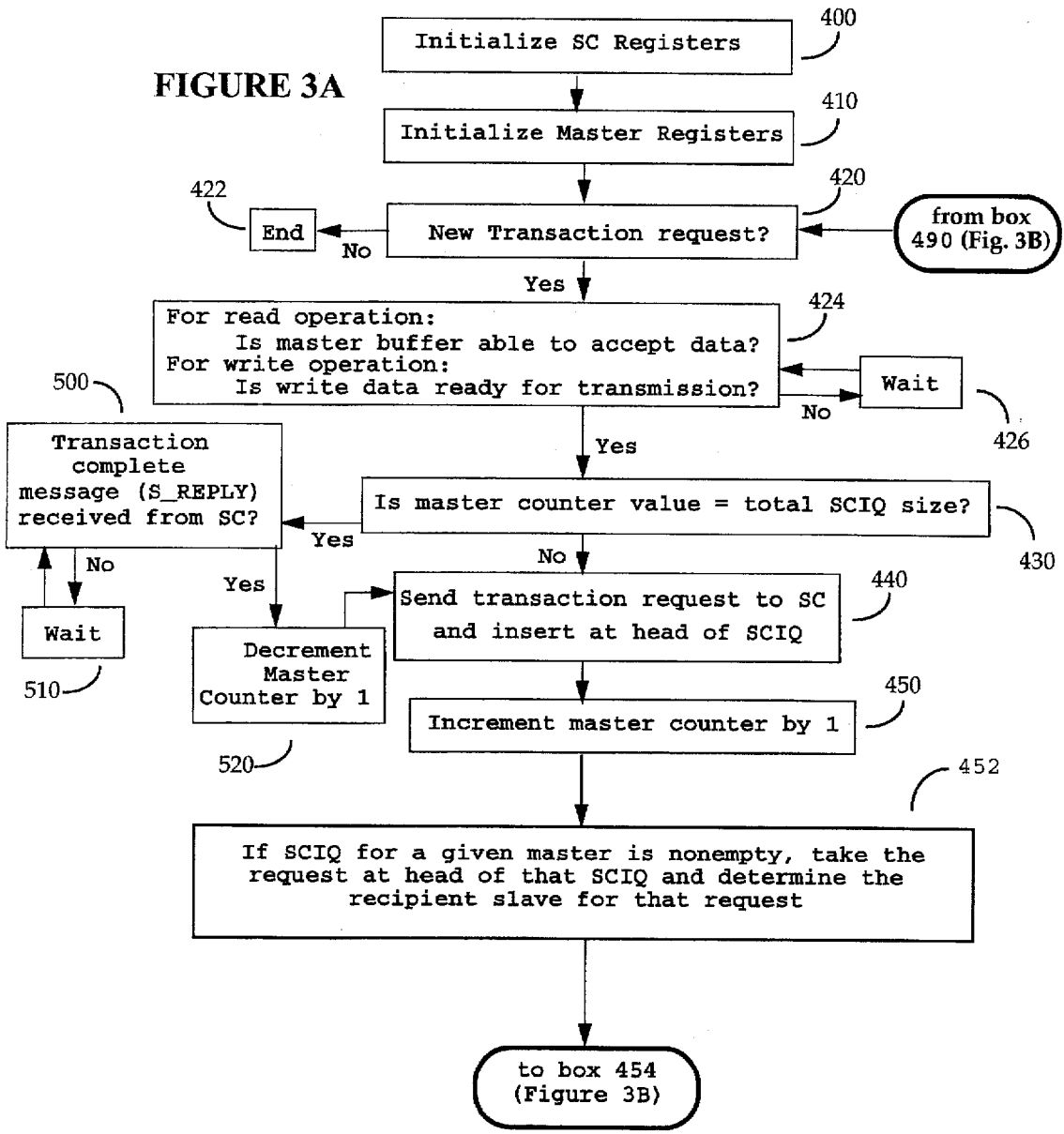
FIGS. 3A–3B together constitute a flow chart illustrating a generalized implementation of transaction flow control in a system according to the invention.
Figure 3B:
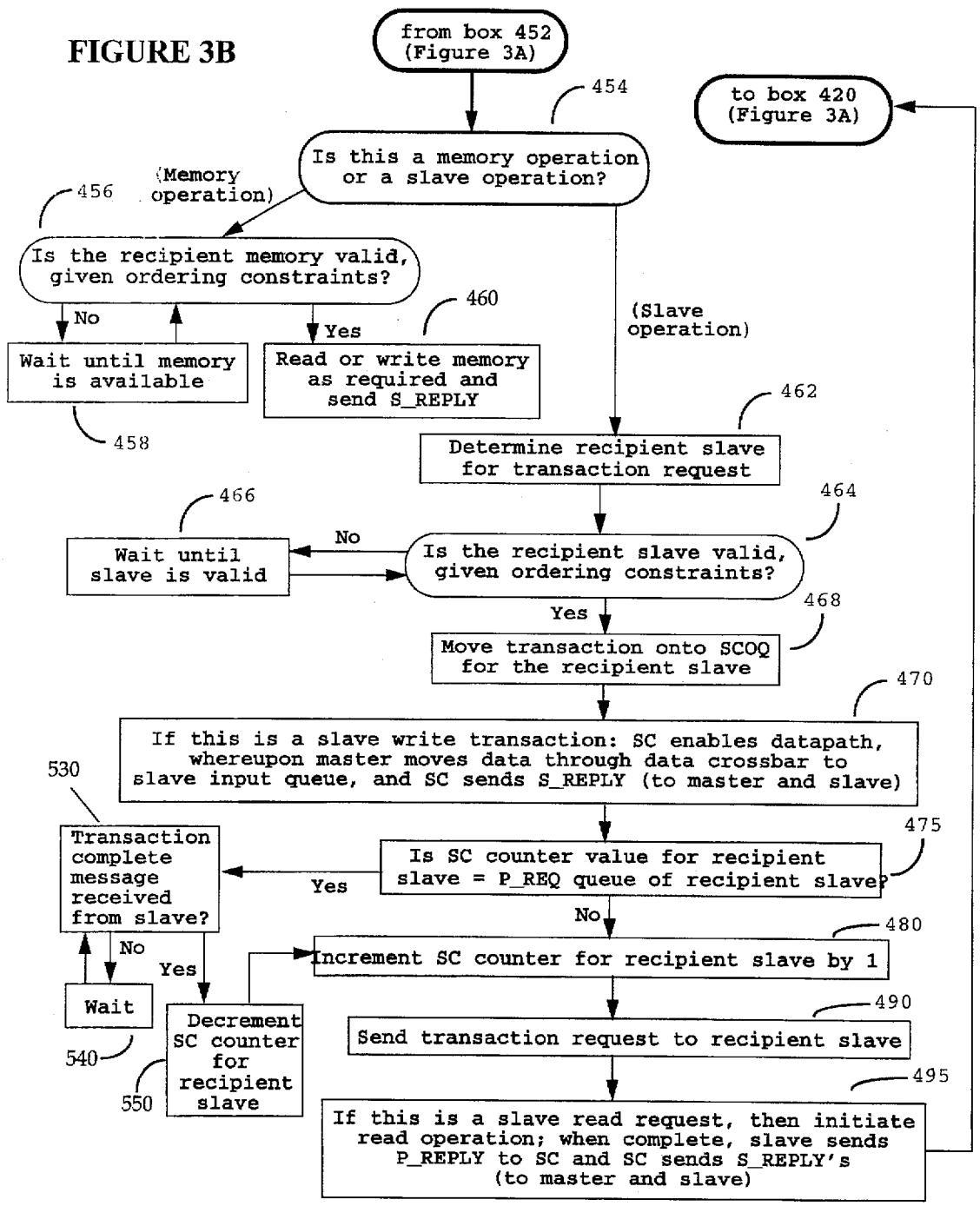

Referring now to FIGS. 3A–3B, at initialization (box/method step 400) all UPA port ID registers (e.g. the slave ID registers 180 and 190 in FIG. 2) are read, and their contents are written into the appropriate fields in the SC config register 200 (or into separate, dedicated config registers, as discussed above). The separate fields in a single SC config register embodiment is more likely to be used when the UPA (slave) ports are configured with a PROM instead of a port ID register. In the present application, whenever fields of the config register are referred to, it may be taken alternatively to mean separate config registers, and vice versa.

At box 410, the master registers are now initialized, which involves reading the SCID registers 255 and 265 and writing the SCIQ sizes (stored in those registers) in the respective config registers 270 and 280.

Since at start-up the con fig registers 200 fields and the config registers 270–280 must allow at least one transaction apiece (to read their corresponding ID registers 180–190 and 250–260, respectively), they are initialized to a value of "1" to begin with, to "bootstrap" the start-up. Then, when the read-ID-registers transaction requests are issued, and the counters are decremented, the requests will be allowed. (If the config registers were all at 0, no transactions would be allowed.) Upon the reading of the respective ID registers, the config register values are replaced with the correct values, i.e. the actual sizes of their associated ID registers.

At box 420, it is determined whether a new transaction request is pending in one of the masters, e.g. the master 120. If not, the procedure stops at box 422 (but may recommence at box 420 at any time that a new transaction request is made).

At box 424, if the pending transaction request is for a read operation, then the system determines whether the master read data buffer (discussed in greater detail below) for the master interface is ready to accept data, i.e. whether there is sufficient room in the master read data buffer to receive the data to be read. If not, then the system waits as at box 426 until the master read data buffer is ready. Note that a write operation need not be held up during a wait period for a read operation, but may proceed independently; and vice versa.

For a write operation, the system determines whether the data to be written to one of the slaves via a slave interface or memory is in fact ready for writing in (transmission to) a master write buffer. If not, again at box 426 a wait period is executed, until the data item is ready for writing.

When either the read or the write operation is ready for execution as far as the master interface is concerned, then at box 430 the system tests whether the value of the master counter (in this example, counter 320) or equal to the value stored in the config register, i.e. the size of the associated SCIQ 260 (as originally provided by the SCID register 265). (The master counter should never be able to exceed the value stored in the config registers, but in case it did this could be taken into account by using a "≧" instead of "=" in the comparison test.) If the counter has not issued requests equal to the total SCIQ 260 size, then this test will be false and the method proceeds to box 440.

If the counter value has reached its maximum allowable value, then the transaction request will not be passed on to the SC, and the method proceeds to box 500. In this case, the transaction request pending in the master interface is required to wait (box 510) until a complete-transaction signal has been received from the SC before it can be issued. In a preferred embodiment, this complete-transaction signal takes the form of an S_REPLY signal, discussed in detail below with respect to FIGS. 4–7.

When this complete-transaction signal is received by the master interface 110 (box 500), the master interface decrements the counter associated with that SCIQ (box 530) and proceeds to the step at box 440.

At box 440, the counter 320 is incremented by one, and at box 450 the transaction request is sent by the master to the SC. Thus, the counter 320 now reflects the sending of one (or one additional) transaction request.

It will be appreciated that boxes 420–450 and 500–520 all relate to method steps that are carried out by or in the master or master interface, such as master interfaces 110 and 120.

It will be seen below that boxes 452–458 and 462–490 (i.e. almost all of FIG. 3B) relate to method steps carded out in or by the system controller (SC). Boxes 460 and 495 relate to the method steps of reading and writing data as appropriate.

The SC is provided with intelligence and/or logic (hardware and/or software) to determine whether it has a transaction request pending in its request receive queue (such as SCIQ's 250 and 260). If so, then at box 452 the transaction request at the head of the queue is examined to determine which slave is intended as the recipient for the request. This queue control and recipient determination is carried out in a conventional manner.

At box 454 (FIG. 3A), the method determines whether the pending operation is a memory operation or a non-memory slave operation. If it is a memory operation, then at box 456 the method determines whether the recipient memory is valid, given global or other ordering constraints.

Some such possible constraints relate to delaying the processing of a memory or slave request by a given master until any requests to any other memory or slave, respectively, by that same master are resolved. That is, from a given master, e.g. master 1, a series of transaction requests to slave 1 may issue, and then a transaction request may be issued for slave 2. A preferred embodiment of the present system ensures that all of the pending slave 1 requests (from master 1) are completed before the new slave 2 request is executed. This ensures any slave 1 action upon which the new slave 2 transaction might rely will have taken place. Thus, strong global ordering of transaction requests from a given master with respect to requests issued to different slaves is maintained. This is accomplished by requiring the master to await a signal called S_REP from slave 1 before issuing the slave 2 request, discussed below.

In other systems, it may be preferable to allow master 1 to freely issue multiple request to slave 1 without awaiting an S_REPLY (transaction-complete) signal from slave 1. Even in such systems, there may be ordering or other constraints upon transactions that can temporarily disallow given memories or non-memory slaves from accepting certain transactions, either of predetermined transaction types or from particular masters, or both, or for some other reasons.

If for any of these reasons the recipient memory is not valid or available at this time, then at box 458 the method waits until the memory is valid and available.

If the recipient memory is valid, then at box 460 the data is read or written to/from memory as required, and the S_REPLY (transaction complete) signal is sent, as described in greater detail below.

If the pending transaction is a non-memory slave transaction, then at box 462 the method determines which slave is to receive the request. At box 464, it is determined whether the recipient slave is a valid recipient at this time, given the ordering or other constraints mentioned above. If not, at box 466 the method waits until the slave is valid.

Once the slave is valid for this transaction, then the transaction request is moved into the corresponding SC output queue (SCOQ) 210 or 220.

If the pending transaction is a slave write transaction, than at this time (box 470) the SC enables the datapath 155 via a datapath control signal, and the master (whose transaction is pending) is then able to move the data through the datapath to the appropriate slave input queue (185 or 195). The SC then sends its transaction-complete (S_REPLY) signal to both the master and the slave (see discussion below relative to FIG. 7).

At box 475, the SC 130 then checks the counter for the recipient slave, e.g. counter 240 if slave 150 is the destination for the pending transaction request. If the counter equals or exceeds the value in the config register (i.e. the size indicated by the ID register 180 or 190, which were read at initialization), then the request is not yet allowed. In this case, then steps 530–550 are followed (essentially identical to steps 500–520), until a free line opens up in the destination slave queue to receive the transaction request.

If the appropriate counter (230 or 240) has not reached its maximum allowed value, then it is incremented by one (box 480), and the transaction request is sent to the recipient slave (box 490).

If the pending transaction is a slave read request then at this point (box 495) the read operation is initiated. When it is complete, the slave sends a P_REPLY to the SC, and the SC sends S_REPLY's to both the requesting master and the recipient slave. See the discussion below relating to FIG. 6 below for details about the transaction and data flow for slave read requests.

At this point, the method then proceeds to box 420 in FIG. 3A, i.e. it is determined whether another transaction request is made.

The flow chart of FIGS. 3A–3B does not necessarily indicate a strictly linear sequence with respect to different transactions (though for a given transaction the flow is linear); e.g. in preferred embodiments a transaction request can be allowed to issue from one of the master interfaces even as another transaction request is issued by the SC to a slave interface. Other types and degrees of parallel operation may be implemented.

Flow Control

Figure 4:
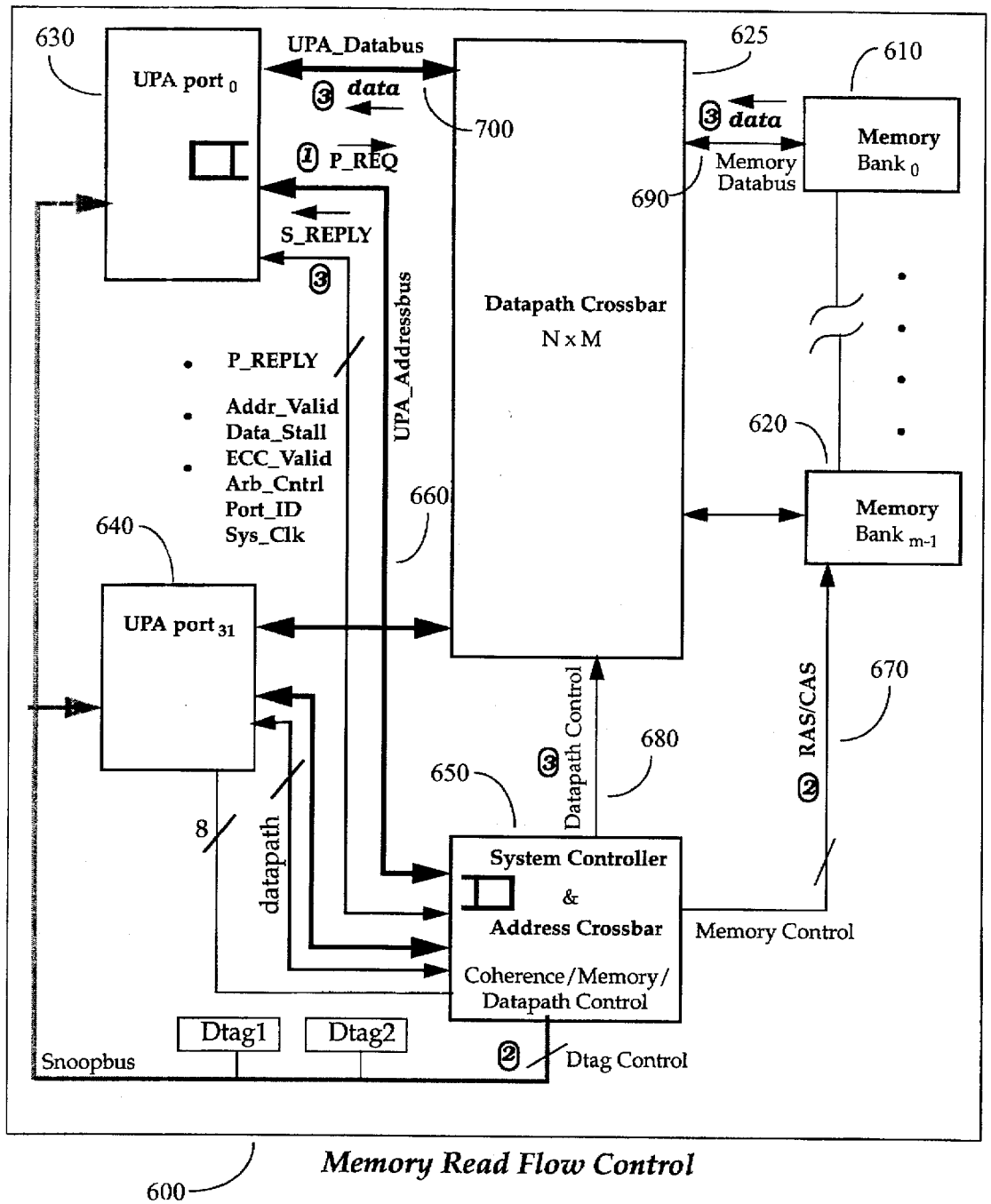
FIGS. 4–7 are block diagrams illustrating transaction flow control for different types of transactions in a system according to the invention.
Figure 5:
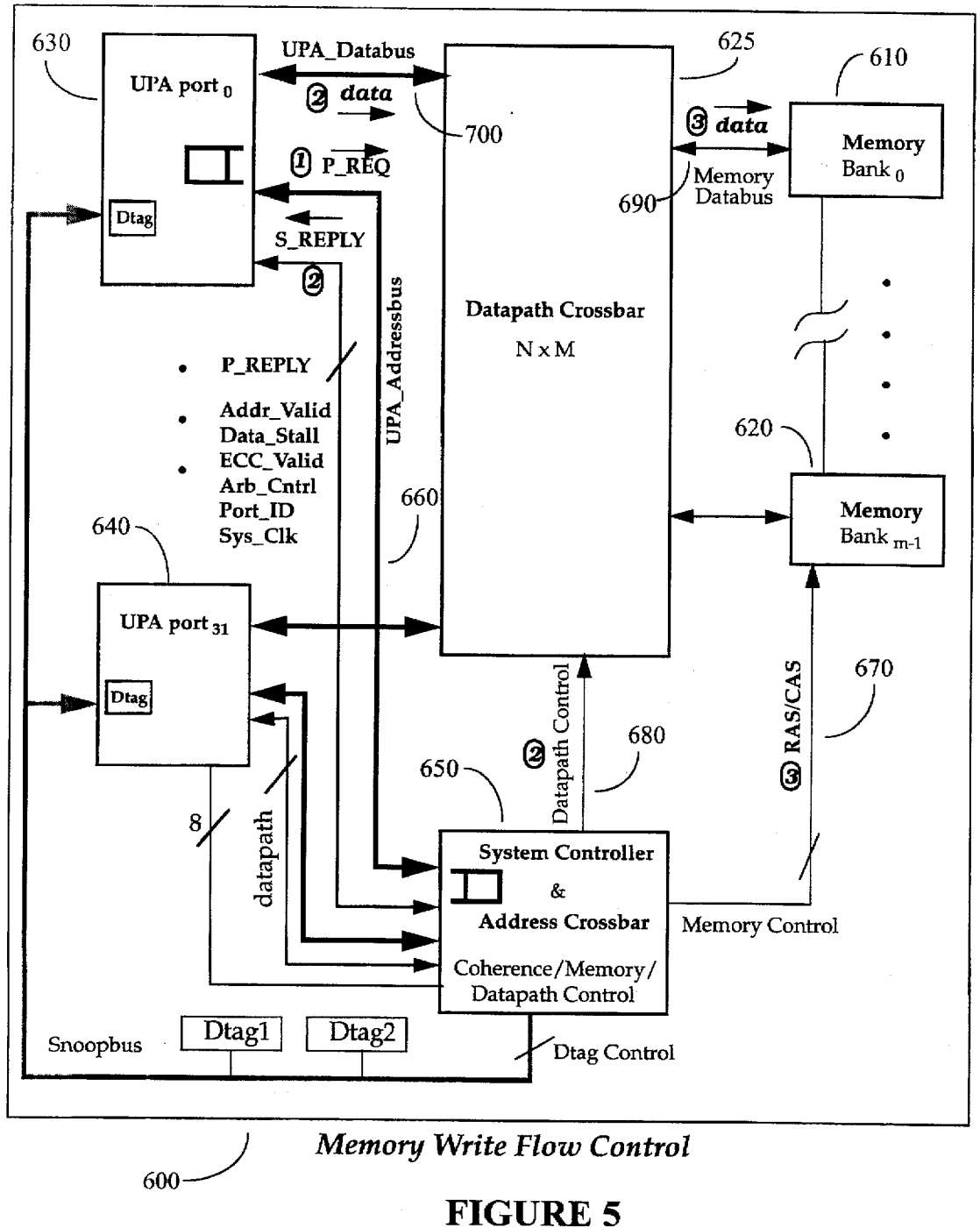
Figure 6:
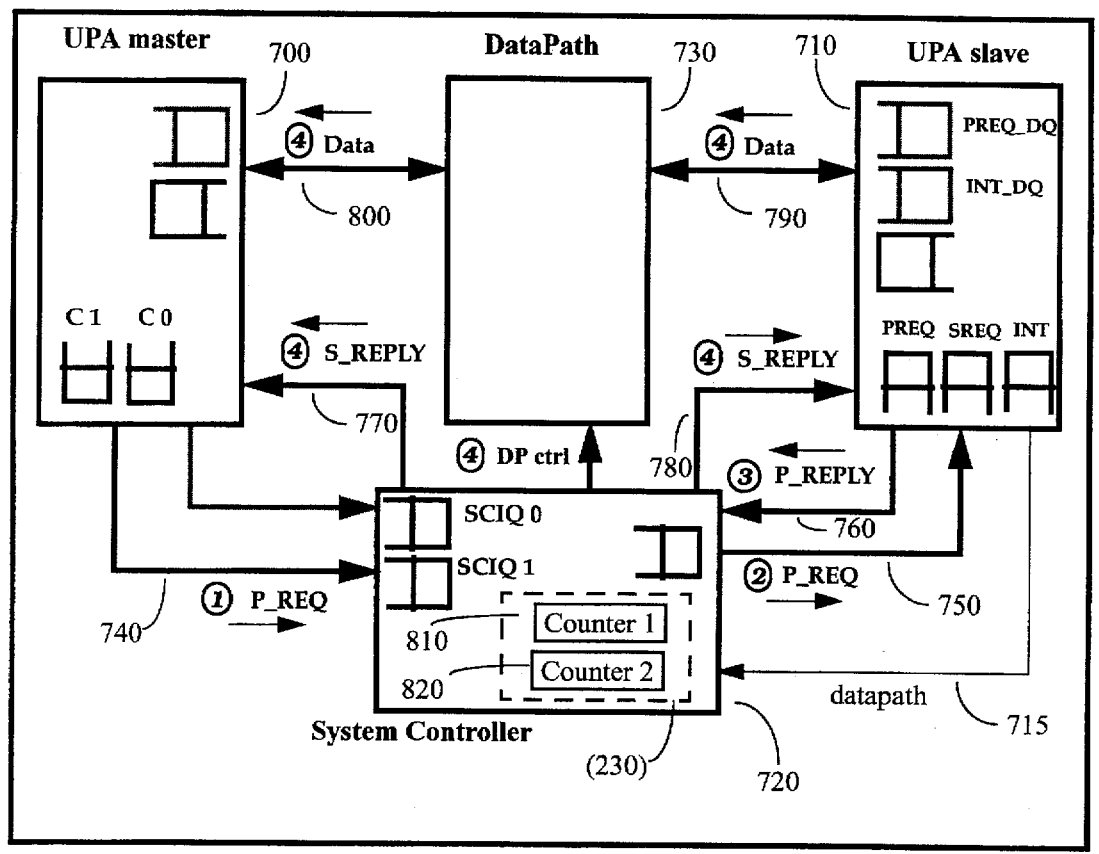

FIGS. 4–7 illustrate how flow control takes place in the present invention for each of four different types of transactions:

FIG. 4: read operation from memory (i.e. where the slave interface is a memory interface;

FIG. 5: write operation to memory;

FIG. 6: read operation from a device other than memory; and

FIG. 7: write operation from a device other than memory.

Other operations, such as cached read transactions (which involve the snoopbus, not a focus of the present invention) are possible, but these will suffice to illustrate the features of the present invention.

In FIGS. 4 and 5, for the sake of simplicity the queues and registers illustrated in FIG. 2 are not shown, but should be understood to be included in both the master interfaces (UPA ports) and system controller, in essentially the same configuration as in FIG. 2. Thus, the transaction control described above with respect to FIGS. 2 and 3 is accomplished also with respect to FIGS. 4–5, as well as 6–7.

However, the memory banks shown in FIGS. 4 and 5 need not include slave queues as shown in FIG. 2, nor does the system controller in FIG. 4 need to include a config register and counters as in FIG. 2; rather, conventional flow control as between a read- or write- transaction requesting device and memory may be utilized, and will be implementation-specific. Many standard designs that ensure that read and write requests are properly meted out to the memory banks will be appropriate. In this example, steps (boxes) 470–490 and 530–550 in FIGS. 3A–3B are replaced by equivalent steps for control of read and write transactions to and from the memories.

In FIG. 4, a specific embodiment of an interconnect module 600 is illustrated, where memory banks 610 ... 620 are the slave devices, with a total of m memory banks being indicated by the subscripts (0) ... (m−1). There are likewise multiple master interfaces (UPA ports) 630 ... 640, in the present example 32 master interfaces being indicated by the subscripts 0 ... 31. A datapath crossbar 625 couples the memory banks to the UPA ports in a conventional manner.

As a rule, in this operation the order of reception of the transaction requests will be the order of reply by the slave interfaces.

In general in FIGS. 4–7, the order of events is indicated by the circled event numerals 1, 2, 3 and 4 (with accompanying arrows indicating the direction of data or signal flow), as the case may be for each figure. With the exception of the fact that the memories in FIGS. 4 and 5 do not include the slave queues and ID register of the slaves shown in FIG. 2, the following description of data flow with respect to FIGS. 4–7 should be understood to include the steps described with respect transaction request control (see FIGS. 3A–3B). Thus, for each request issued, the appropriate counter consultation, incrementation and decrementation is carried out to determine that the request is sent at an appropriate time. The respective queues are also handled as appropriate.

Memory Read Requests: FIG. 4

This read request example assumes that data is coming from memory, and not, e.g., from a cache. Snoop operations on the snoopbus shown in FIG. 4 are not in consideration here.

Event 1: When a UPA master port such as post 630 has a read-from-memory transaction ready, and the master counter is not at its allowed maximum (see box 430 in FIGS. 3A–3B), the read transaction is issued on the UPA_Addressbus from UPA port 630 to the system controller 650. This is indicate by the event 1 (P_REQ) along the UPA_Addressbus 660 in FIG. 4, with the direction of the information indicated by the arrow, i.e. from the port to the SC.

Event 2: The memory cycle [i.e. RAS (read-address-strobe)/CAS (column-address-strobe) request issuance] is issued over memory control bus 670 to the memory banks 610 ... 620. See vent 2 ("RAS/CAS") along bus 670.

Event 3: The datapath is scheduled by a signal along the datapath control bus 680, and data items are accordingly delivered from memory to the datapath crossbar 625 via a memory databus 690 and UPA databus 700. This fulfills the read request.

Memory Write Requests: FIG. 5

FIG. 5 depicts the same circuit as FIG. 4, but the flow is different because it relates to a (non-cached) write operation instead of a read operation. Event 1 is the issuance of the write request along the UPA address bus 660.

In event 2, the datapath control signal over the bus 680 is sent to enable the datapath crossbar 625. Also, an S_REPLY is sent over bus 710 by the SC 650 to the UPA port 630 to source the data after the datapath is scheduled, and the data items are sent from the UPA port 630 to the datapath crossbar over data bus 700. Here, they are buffered, in preparation for forwarding to the memory banks. At this point, the counter in the UPA port is decremented to show that another transaction request is available to the system controller.

In event 3, the memory banks are enabled via bus 670 using RAS/CAS signals, and data items are sent via bus 690 to the memory banks. This completes the write operation.

The foregoing method ensures that no write request is issued until the write data are ready. E.g., if the databus 695 is 144 bits wide, but the bus 690 is 288 bits wide, the data words are buffered in the crossbar, assembled into 288-bit blocks, and then written to memory.

Slave Read Requests: FIG. 6

FIG. 6 illustrates a read sequence to a slave device other than memory, and is similar to FIG. 2, but for this example a single master interface 710 and a single slave interface 720 are used, coupled by a system controller 720 and a datapath crossbar 730.

Event 1 indicates the issuance of a read request P_REQ on UPA address bus 740 to SC 720.

In event 2, the SC 720 sends the P_REQ on bus 750 to the slave interface 710. To do this, if there are several slave interfaces, the SC must first decode the address to ensure that the P_REQ goes to the correct slave interface. Event 2 informs the slave interface to prepare the data to move through the datapath.

When the data items are ready, then event 3 takes place, namely the sending of a P_REPLY from the slave 710 to the SC 720 over bus 760.

In event 4, a series of steps are executed to cause the master interface to receive the data: SC 720 schedules the datapath 730, and issues an S_REPLY over bus 770 to the master interface 700. In addition, the SC issues the S_REPLY over bus 780 to the slave 710, to drive the data, when it is ready, on the slave's UPA databus 790 via the datapath and over the databus 800 to the master interface 700.

Slave Write Requests: FIG. 7

FIG. 7 shows the identical apparatus as FIG. 6, but illustrates a write sequence from a non-memory slave interface to a master interface. This sequence ensures that data cannot be transferred until the data queue PREQ_DQ of the slave interface 710 has sufficient space.

In FIGS. 6 and 7, both a transaction request counter 810 and a data queue counter 820 are shown in the SC 720. These are counters to determine how full the PREQ queue and PREQ_DQ queue (slave output data queue) are, respectively. If these two queues are of different sizes, then their associated counters 810 and 820 are of different sizes. If these two queues are the same size, then a single counter may be used in the SC to monitor how full both queues are.

Event 1: The first event of the write operation is that a P_REQ is issued by the master interface 700 to the system controller 720 over bus 740.

Event 2: In event 2, the SC issues the P_REQ over bus 750 to the slave interface 710. The P_REQ includes sufficient words to inform the SC how much data is being written. As mentioned above, the slave data queue counter 820 is used to track how full the data queue PREQ_DQ is. If the PREQ_DQ queue is too full, then the write transaction must wait.

The data queue PREQ_DQ may be the width of one word (e.g. 16 bits) or a block (e.g. 64 bits). Multiple transfer sizes are thus supported in the current system. Possible queue organizations include the maximum capacity per request, or some fraction of the maximum capacity per request, e.g. the 64-bit and 16-bit examples cited above.

If the queue PREQ_DQ is sufficiently available, then the write operation may proceed. Further in event 2, the SC schedules the datapath 730 with a datapath control signal "DP ctrl", and issues an S_REPLY to the master interface over bus 770 to drive the data on its data bus 800. In addition, the SC issues the S_REPLY over bus 780 to tell the slave interface 710 to receive the data over its data bus 790.

The transaction is complete as far as the master interface is concerned once it has received the S_REPLY and the data has been transferred over the bus 800 to the datapath crossbar 730. Thus, at this point, even though the slave interface may not yet have received the data, the master interface is prepared for an additional transaction.

Since the address and data paths are independent, the request packet (which includes the destination address) and the corresponding data may be forwarded in any order to the slave port. That is, the data might actually arrive at the input queue PREQ_DQ before the P_REQ arrives at the queue PREQ of the slave. If this happens, the data will have to wait until the P_REQ arrives, so that the slave can determine the destination address for the data. Alternatively, of course, the P_REQ may arrive first, and the data second, in which case it can immediately be written to the destination address specified by the P_REQ.

Event 3: Once the slave has cleared the requested data from its data queue and the transaction request from its input queue, it issues a P_REPLY over bus 760 to the SC, indicating that it is ready for another transaction. The SC decrements its counters 810 and 820 accordingly. The transaction is now complete from the SC's point of view; i.e. there are no more actions to be taken by the S C.

Transaction Ordering

The transactions herein are any type of request by a master device or module (hardware, software, or a combination). These include read-data transfers, write-data transfers, etc., which must be connected with the read and write replies. That is, for example, each write request is logically linked to write data (i.e. data to be written). While in the foregoing description the ordering of data transfer has been assumed to be governed by the order of write requests, other possibilities exist.

For instance, a link between a write request and the write data may be accomplished by assigning tokens to each write request and its corresponding data. The tokens would then be used to inform the system controller and processor of the completion of a given write request; that is, the write data carries its token along with it, and when it is received the write request having the associated token is known to be complete. Such a system requires token match logic to locate the associated tokens. The token system can be applied to the system controller operation described above for any transactions requested by a master, and frees up the ordering requirement of transaction request vis-a-vis completion of the requests; that is, read and write transactions may be carried out in an order other than the order in which they were issued.

In any case, for each transaction there will be a corresponding reply by the system controller, whether or not there is a data transfer. As a general matter, the order of events for various transactions will be:

> Read from slave: read request→slave read reply→read data transfer (optional)
>
> Write from master: write request→SC write reply→write data transfer (optional)
>
> Write from slave: (write request/write data transfer, in either order)→slave reply when write data is consumed Thus, the present system is adaptable to many different ordering schemes, or indeed to schemes such as a token system where no particular ordering is required.

Section 2. Interrupt Request Control

Interrupt requests from an interrupter to a UPA port are handled by the packet-switched system discussed above. The interrupter generates an interrupt transaction request packet P_INT_REQ which is issued to the SC, along with a 64-byte (or other desired size) block of data to be delivered to the destination, i.e. the device to be interrupted. The interrupt request P_INT_REQ (which may also be referred to as "the INT request") may be sent by I/O devices, asynchronous event/error reporting processes, or by any other device or process capable of generating interrupts in a conventional manner.

The INT requests are sent by the interrupter to a central resource (here, the SC), which forwards them at an appropriate time to an interrupt handler UPA port, i.e. an interface that is preconfigured to handle incoming interrupts. It is an important feature that the interrupters can freely send out interrupts to the SC, which takes on the tasks of routing the interrupts and determining whether the targets are available to receive them, an then responding accordingly to the interrupter. While the SC is carrying out these functions, the interrupter can continue to execute other functions, including unloading its own incoming interrupt data or accepting new interrupts.

A method for handling interrupts that are improperly transmitted to a port that is not configured as an interrupt handler is described below. In the preferred embodiment of the invention, an interrupt cannot be sent to oneself, i.e. to the same device or process that generated the interrupt.

Figure 8:
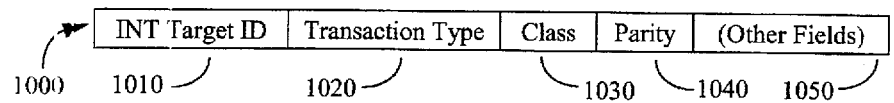
FIG. 8 illustrates an exemplary data structure for an interrupt request of the invention.

A data structure 1000 appropriate for implementing the interrupt request P_INT_REQ is illustrated in FIG. 8. The packet shown carries an interrupt target ID 1010, a transaction type 1020, a class 1030, a parity field 1040, and other fields 1050 as desired.

The interrupt target ID 1010 may be a physical address or may be a master ID maintained by the system controller. A device may have a single target ID, or it may have several. In the latter case, the target device preferably includes a table in memory or a set or registers (or register fields) storing information correlating the interrupt sources and their corresponding target ID's. For example, for an I/O device this information is written into a set of interrupt configuration registers contained in the master-interface logic that interfaces the I/O device to the SC. (Other information may also be written in the configuration register, such as interrupt priority level for the device, opaque information for the benefit of the interrupt handler, etc.)

A. Interrupt Transaction Control: Apparatus

Figure 9:
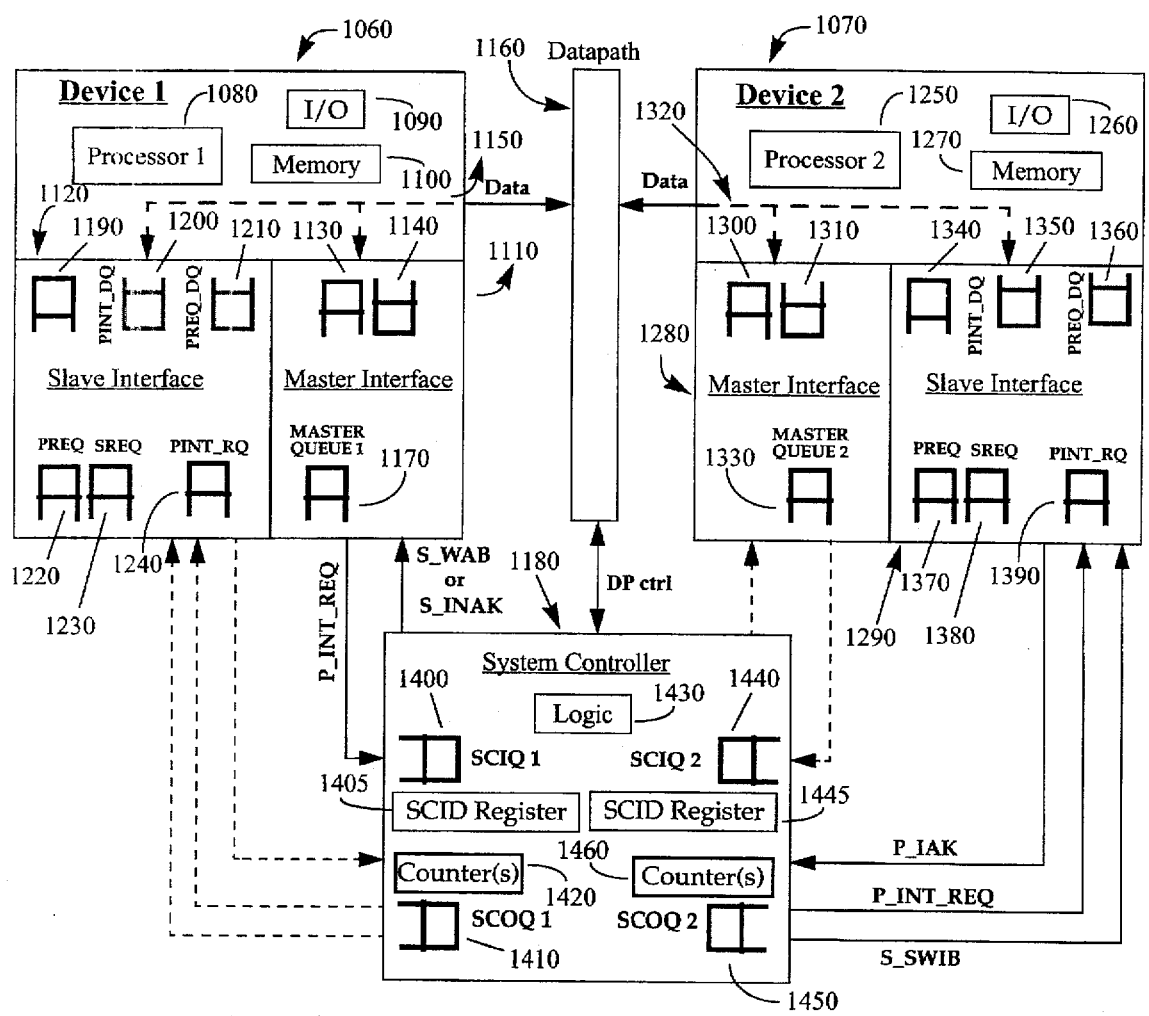
FIG. 9 is a block diagram illustrating interrupt transaction control according to the invention.
Figure 10:
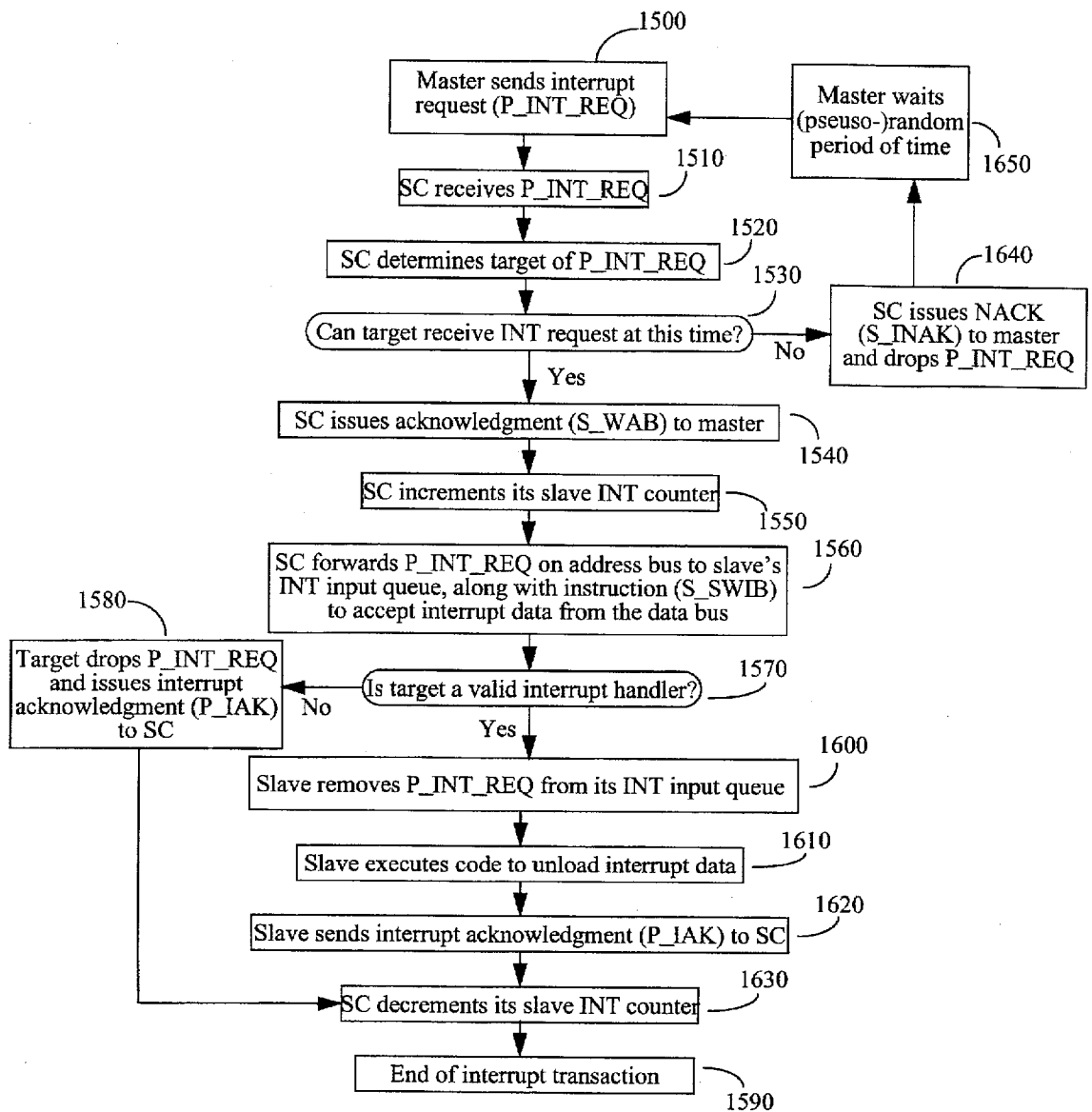
FIG. 10 is a flow chart depicting a method of interrupt transaction control of the invention.

FIGS. 9 and 10 illustrate the apparatus and method for handling interrupts according to the invention. In FIG. 9, two devices 1 and 2 (designated by reference numerals 1060 and 1070) are shown. Device 1060 may be a conventional processor 1080, having associated I/O device(s) 1090 and memory 1100, and being coupled to a master interface 1110 and a slave interface 1120. The master interface 1110 includes input and output data queues 1130 and 1140 coupled to a data bus 1150 and datapath crossbar 1160, and further includes a transaction request output queue 1170 coupled to system controller 1180.

The slave interface 1120 similarly includes a data output queue 1190, as well as an interrupt data input queue 1200 to receive the aforementioned 64-byte data packets transmitted along with the INT requests, and a request data queue 1210 as described in Section 1 above. The slave interface 1120 additionally includes PREQ and SREQ queues 1220 and 1230, and an interrupt request input queue 1240 (labeled PINT_RQ).

Device 1070 may be a device similar to or different from device 1060. For purposes of illustration, a device is shown which is identical to device 1060, though it should be understood that any device incorporating the features of the invention may be used. Thus, device 1070 comprises a conventional processor 1250 with associated I/O 1260 and memory 1270, and includes a master interface 1280 and a slave interface 1290. The master interface 1280 includes input and output data queues 1300 and 1310 coupled to data bus 1320, which in turn is coupled to the datapath crossbar 1160. Master interface 1280 also includes one or more output request queues 1330, as described in Section 1 (see particularly FIGS. 2 and 6–7).

The slave interface includes an input data queue 1340, an interrupt input data queue (PINT_DQ) 1350, and a transaction request data queue (PREQ_DQ) 1360. In addition, it includes a PREQ and SREQ queues 1370 and 1380 and an interrupt request input queue (PINT_RQ) 1390.

The system controller (SC) 1180 includes one or more input request queues (SCIQ) 1400 (one corresponding to each master queue 1170), and one or more output request queues (SCOQ) 1410 (one corresponding to each slave coupled to the SC). As described in Section 1 above, each SCIQ 1400 has an associated SCID register 1405 identifying its capacity, and each SCOQ 1410 has an associated counter 1420 for monitoring, under the control of logic 1430 of the SC, the number of transactions pending at an associated slave's input queue (here, queues 1220, 1230 and 1240).

For the purposes of this Section 2, the output queues associated with queues 1220 and 1230 are not shown; i.e., for simplicity of illustration, only the output queue 1410 of the SC associated with the PINT_RQ queue 1240 is shown.

The SC additionally includes a transaction request input queue (SCIQ) 1440 coupled to each master output queue 1330, and an associated SCID register 1445 identifying its size, as well as one or more transaction request output queues 1450, one such queue being coupled to each slave interrupt request input queue (PINT_RQ) 1390, and counter(s) 1460, with one counter for each such output queue 1450 to monitor the number of outstanding interrupt requests to the slave interface 1290.

Again, the output queues associated with PREQ and SREQ 1370 and 1380 are not shown, for the sake of more clearly illustrating interrupt handling.

The features of the apparatus of FIG. 9 may be identical to like-labeled and identified features in FIGS. 1–7. Thus, the discussion in Section 1 above applies fully to the apparatus of FIG. 9.

B. Interrupt Transaction Control: Method

The flow chart of FIG. 10 illustrates the method of the invention, which is carried out in connection with the apparatus of FIG. 9, using interrupt request packets as depicted in FIG. 8. In describing this method, it will be assumed that device 1060 in FIG. 9 has issued an interrupt request to device 1070, and that device 1070 includes an appropriate interrupt handler, i.e. the slave interface and associated software stored in memory and executed on the processor 1250 to execute the required interrupt service routine. Thus, in FIG. 9, the dotted lines represent actual connections that do not happen to be used for the interrupt transaction under discussion, while the solid lines are the connections (lines, buses) used by the particular transaction of the example.

The nature of the interrupt transactions themselves may in the present invention be conventional; it is the manner and apparatus for controlling the handling of these transactions that are new. Thus, any standard interrupt handlers and mechanisms for performing interrupt service routines may be used.

The initialization procedure described in Section 1 is followed with respect to all interrupt handlers/slaves as well. Thus, each slave includes an interrupt input queue such as PINT_RQ 1390, and for each such queue 1390 the SC includes a config register (shown in FIG. 2, but not separately shown in FIG. 9), a counter (such as 230–240 in FIG. 2 or 1460 in FIG. 9), and preferably an associated output queue (210–220 and 1450). INT requests are handled in the same manner as other transaction requests at this stage in the pipeline, i.e. they are queued in the SC's output queue, sent to the slave only when the PINT_RQ has space, and the number pending in a given PINT_RQ is monitored by the count of the associated counter. The size of a given PINT_RQ is stored in the associated config register, which is, as described in Section 1, written with the value from the slave's ID register at the time of initialization.

Except as specifically noted below, or with respect to interrupt operations that are either inherently different from other transaction requests (as discussed in Section 1) or as otherwise indicated in this Section 2, the apparatus (and its operation) for handling the interrupt requests is the same as described in Section 1 relative to other transaction request handling.

An interrupt event begins with the issuance of an interrupt request (or INT request) P_INT_REQ by the master, as at step (box) 1500 in FIG. 10. The SC 1180 receives the INT request (box 1510), and determines (at box 1520) from field 1010 (target ID) the appropriate target for the interrupt. This is done by SC logic 1430, i.e. circuitry and/or software configured in a conventional manner for this purpose.

At box 1530, the SC 1180 determines by examining its counter 1460 whether the slave interface 1290 can accept an INT request—i.e., the SC determines whether the slave INT request input queue 1390 is full.

In prior systems, only one interrupt at a time can be accepted. The use of the INT input queue 1390 allows the interrupted device 1290 to accept as many interrupts as desired, as determined by the depth of the queue. It may, if desired, still be only one deep, or it may hold many INT requests. This allows the interrupt handler to accept INT requests even though they may be in the middle of noninterruptible tasks, or processing another interrupt, or sending out their own interrupts. This helps increase throughput of interrupts and the system as a whole, particularly where there are many interrupts being issued to a given device.

Assuming at this point that the slave (interrupt handler) can accept a new INT request, the method proceeds to step 1540, where the SC issues an acknowledgment S_WAB (for SC Write Acknowledge Block) to the master interface 1110, as illustrated in FIG. 9, thus communicating to the master that the SC was successful in delivering the INT request to the slave.

At step 1550, the SC increments counter 1460 to reflect the transmission of the INT request to the slave.

At step 1560, the INT request (P_INT_REQ) itself (see FIGS. 8 and 9) is forwarded on an address bus to the slave 1290, along with an instruction S_SWIB (for SC write interrupt block) to the slave to accept the 64-byte interrupt dam packet (not illustrated) via the data bus 1150, the data crossbar 1160 and the data bus 1320. The datapath crossbar 1160 is enabled by the DP control (DP ctrl) signal on the line connecting the SC 1180 to the crossbar 1160 at effectively the same time as the S_SWIB signal is sent.

The configuration of the interrupt data packet will be according to the needs of the system designer. It is highly advantageous to provide this data packet (over the data bus, in the preferred embodiment) at effectively the same time as the INT request itself, since this allows the interrupt handler to immediately go about processing the interrupt, without further reads from the interrupter to the interruptee, as has been required in prior systems. For instance, the interrupt data packet can include a priority signal, the interrupt vector, necessary actual data the interrupt handler will need (including, e.g., data to be written to memory or cache), the ID of the interrupting device, and so on. This helps interrupt throughput and reduces the number of transactions required by both the interrupter and the interruptee.

The 64-byte data packet may be transmitted to the interrupt handler (slave) in the same manner as described above in Section 1 for slave write requests, using S_REPLY's and P_REPLY's as shown in FIG. 7.

At step 1570, the SC determines whether the recipient slave comprises a valid interrupt handler. The SC is preconfigured (by logic, memory and/or other conventional means) to be able to determine from the target ID and/or the address of the target what type of device the target is, such as a processor. If the target of the INT request is not a valid interrupt handler, which indicates an error (such as a programming error), the present system drops the INT request (box 1580)—i.e., it does nothing with it at all—and nonetheless issues an interrupt acknowledgment (P_IAK) back to the SC (see FIG. 9), as though the target were valid. (Why a valid P_IAK is returned is explained below.) The method then proceeds to step 1630, where the SC decrements its slave INT counter 1460, and then to step 1590. which ends the INT transaction (unsuccessfully, since an improper target was identified in the INT request).

If at step 1570 the target is found to be valid, then the slave removes the INT request from its INT input queue (PINT_RQ) 1390 (see box 1600), and executes predetermined steps (stored in memory 1270) to unload the interrupt data in its PINT_DQ queue 1340. The interrupt vector or other data with the 64-byte data packet are thus processed, and the slave sends an interrupt acknowledgment P_IAK to the SC (box 1620). This is a signal to the SC of successful completion of the interrupt request, and thus at step 1630 the SC decrements its INT request counter 1460, and at box 1590 the interrupt transaction is complete.

If at box 1530 the target is unable to receive the pending INT request, then the method proceeds to step 1640. The typical reason why a target would be unable to receive an INT request would be that its PINT_RQ (INT request input queue) is full, i.e. it has received the maximum number of INT requests allowed to it by the depth of its PINT_RQ queue without issuing a P_IAK. In this case, the SC issues a negative acknowledgment (commonly called a NACK, and identified in FIGS. 9 and 10 as S_INAK) to the master, and the SC drops the P_INT_REQ without passing it on to the slave. At step 1650, the master waits a random (or pseudorandom) period of time, then proceeds to step 1500 to reissue the INT request.

Because the master is configured to reissue the INT request, no state of the system need be maintained by the SC. I.e., once it issues its NACK, it need not retain any information about that INT request or its disposition, which could otherwise require considerable transaction history maintenance.

The randomness of the period of time that the master waits before resending an INT request helps to prevent situations where a given interrupter repeatedly sends interrupts to another device, preventing the receiving device from sending its own interrupts (by causing it to delay its own interrupts to process incoming interrupts from the first interrupter). (In this application, "random" may be taken to mean either truly random or pseudorandom, i.e. random with certain predetermined constraints.) Thus, the interrupter is caused to delay some random period of time, and in that period the second device gets a chance to clear the outstanding interrupt(s) and issue its own interrupt request. This promotes evenhandedness in the ability of each master to deliver interrupts.

The ability of an interrupted device to unload an INT request from its INT input queue during the random retry interval prevents live-lock (also referred to sometimes as deadlock) situations. For example, if a first processor sends an interrupt that gets NACKed, and had already received an interrupt request from a second interrupter, in earlier designs, the first processor would have to wait until its own outgoing INT request has been successfully transmitted (and ACK'ed) before it can process the previously received INT request from the second processor. In the system of the present invention, the first processor will receive a NACK for its outgoing INT request, and then can go ahead and process the INT request from the second processor sitting in the first processor's input queue. The first processor will send its outgoing INT request again after the random wait interval.

It should be noted that in conventional systems, the sending of an INT request is a multi-instruction sequence which can't be interrupted, i.e. an INT request cannot normally be received while a processor is in the midst of sending its own INT request. In the current system, by way of contrast, the processor can receive as many INT requests as it has spots in its INT request queue, regardless of its current operation when those INT requests are received.

In general, the use of a separate INT request queue PINT_RQ in each interrupt handler/slave prevents the blocking of data transactions by INT requests, and reduces latency.

Returning to the dropping of the INT request at box 1580: if the INT request were not dropped, but rather a S_INAK were issued to indicate a failed interrupt attempt, then the master would simply wait the random period of time and reissue the improper interrupt request. The dropping of the INT request ensures that it will not be resent.

Figure 11:
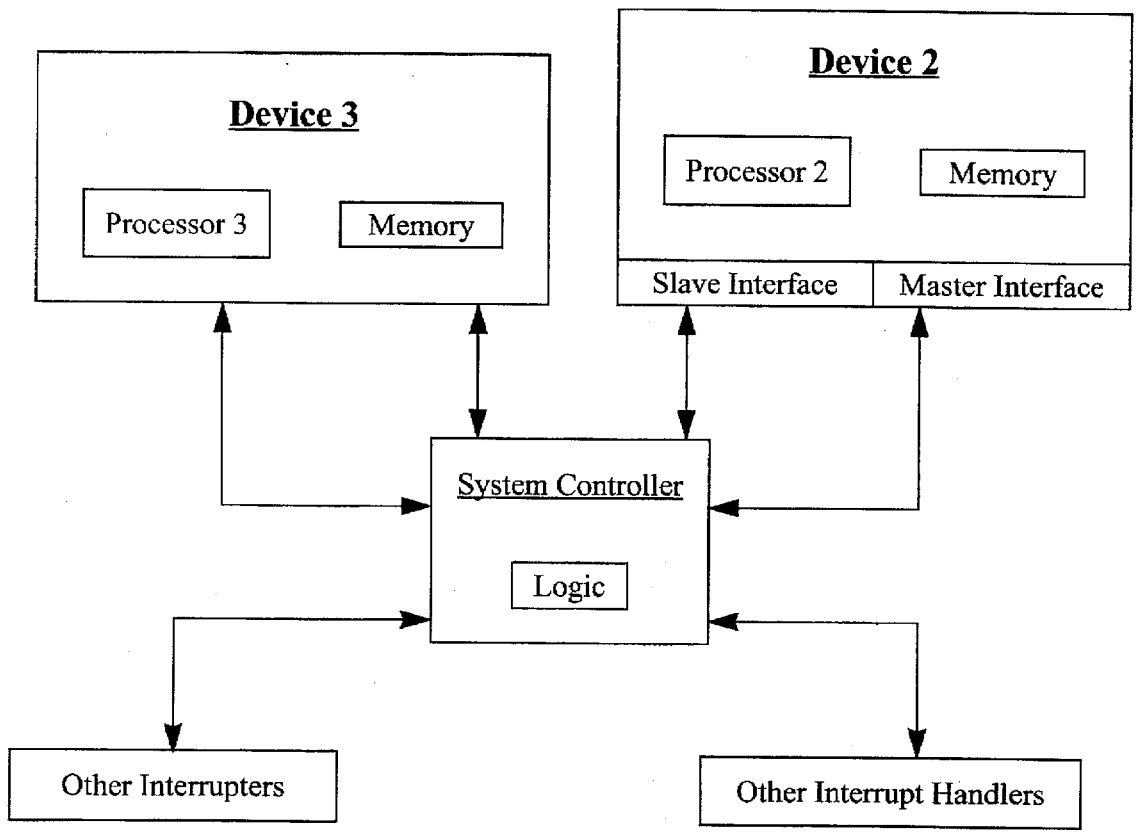
FIG. 11 is a block diagram illustrating the use of the invention with a hardwired interrupting device.

FIG. 11 shows a system of the present invention accommodating an interrupting device 3 which has a single-wire interrupt line. In this case, the system controller is provided with logic (which may be software and/or hardware, typically software instructions controlling operation of an ASIC or processor, or even firmware) and information necessary to convert the hardware interrupt from device 3 into a packet-switched interrupt according to the invention, and the interrupt handler (device 2) can receive the INT request into its receive queue.

As shown in FIG. 11, multiple interrupters and potential interrupt targets are typically coupled to the system controller, and at time of initialization the SC reads the INT input queues from all interrupt handlers. The SC is configured (preferably by software stored in its memory and executed by its processor, but potentially also in hardware) for routing the incoming interrupt requests appropriately—typically by use of the target IDs.

Additionally, the SC can route the incoming INT request from device 3 in a number of alternative ways. For instance, the SC may be configured such that all incoming INT requests from device 3 (which will typically be one of many possible interrupters connected to the SC) are directed to a particular interrupt handler, such as device 2 (which will likewise typically be only one of many interrupt handlers connected to the SC).

Alternatively, the SC may dynamically retarget incoming INT requests from device 3, on order to distribute the INT requests evenly among available interrupt handlers, to ensure that no one interrupt handler becomes overburdened. This can be assisted by the SC keeping a log (using conventional tables, memory or the like) of the number and/or time of sending INT requests to all of its available interrupt handlers, and thus basing the decision as to the current interrupt handler upon the history of past targets. The targets for the incoming INT requests may also be randomized, which is another way of ensuring evenness of distribution of the requests.

A particular application of the foregoing is that a processor can make a software cross call directly to another processor in the address field of the call. The cross call goes to the SC, which is provided with instructions (stored in its associated memory) and/or logic (including software and/or circuitry) to generate a processor interrupt packet for the receiving processor. The use of the target ID for the receiving processor allows this specific targeting and translation into an interrupt packet, and the procedure for handling the generated interrupt/software call is as described above.

What is claimed is:

1. A method for handling interrupt requests from a first device to at least one of a second device and a third device via a system controller coupled to each of at least the first, second and third devices, said second and third devices being interruptible devices, each said device and the system controller including a processor and a memory storing instructions for execution by the respective processors, the second device being coupled to a first interrupt input queue and the third device being coupled to a second interrupt input queue, each said interrupt queue configured for accepting at least one interrupt request, the system controller being configured to store queue size information relating to respective sizes of said first and second input queues, the method including the steps of:

(1) generating in the first device a first interrupt request with said second device as a destination device for said first interrupt request;

(2) receiving said first interrupt request at the system controller;

(3) based at least in part on said queue size information, determining in the system controller whether the first interrupt input queue is full, and if not, then:

(3A) passing said first interrupt request to the second device; but if so, then:

(3B) sending the first device a signal indicating non-acknowledgment of said first interrupt request.

2. The method of claim 1, further including, after step 3B, the step of resending said first interrupt request by the first device after a wait interval.

3. The method of claim 2, wherein the wait interval is a random time interval.

4. The method of claim 1 wherein said first interrupt request includes a target ID, including the step of the system controller determining the destination device of said first interrupt request from the target ID.

5. The method of claim 1, including the step of transmitting a data packet to the second device including information relating to the processing of said first interrupt request.

6. The method of claim 5, wherein the data packet includes an interrupt vector indicating an address for an interrupt service routine.

7. The method of claim 5, wherein the data packet includes at least one instruction to be executed by the second device.

8. The method of claim 5, wherein the data packet includes a relative priority level for said first interrupt request.

9. The method of claim 1, wherein said first interrupt input queue is configured for receiving a plurality of said interrupt requests.

10. The method of claim 1, wherein the second device is configured for continuing processing of ongoing operations while receiving at least one said interrupt request.

11. The method of claim 1, including, after step 3A, the steps of:

determining in the second device whether it is an appropriate recipient for the interrupt request, and if so, then sending a positive interrupt acknowledgment to the system controller.

12. An apparatus for handling interrupt requests from first device to at least one of a second device and a third device, said second and third devices being interruptible devices, each said device including a processor and a memory storing instructions for execution by the respective processors, including:

a first interrupt input queue coupled to the second device for receiving at least one interrupt request;

a second interrupt input queue coupled to the third device for receiving at least one interrupt request;

a system controller coupled to at least the first, second and third devices and configured to store queue size information relating to respective sizes of said first and second interrupt input queues, and including a third input queue for receiving at least one interrupt request from said first device, a counter for monitoring a number of interrupt requests present in the first input queue, and logic configured to pass said interrupt request which is directed to said second device only if said first input queue is not full, the determination of whether said first input queue is full being based at least in part on said queue size information.

13. The apparatus of claim 12, wherein the system controller is configured for sending a positive acknowledgment to said first device if a given said interrupt request directed to said second device is passed to said second device and for sending a negative acknowledgment to said first device if said given interrupt request is not passed to said second device.

14. The apparatus of claim 13, wherein the first device is configured to resend a said interrupt request after a wait interval receiving a negative acknowledgement from said system controller.

15. The apparatus of claim 14, wherein said wait interval is a random interval of time.

16. The apparatus of claim 12, wherein said first input queue is configured for storing a plurality of said interrupt requests.

17. The apparatus of claim 12, wherein said first device further includes a data input queue for receiving at least one data packet correlated with a given said interrupt request.

18. The apparatus of claim 12, wherein the system controller is configured for determining a target device of said interrupt requests.

19. The apparatus of claim 18, wherein:

a plurality of potential interrupt handlers are coupled to said system controller;

said system controller is configured for tracking a history of said interrupt requests sent to each of said plurality of interrupt handlers; and said system controller is configured for selecting a target interrupt handier to receive an incoming interrupt request based upon said history.

20. The apparatus of claim 12, wherein said second device is configured for determining whether it is an appropriate target for a received interrupt request, and if so for sending a positive acknowledgment to said system controller.

* * * * *